(12) United States Patent
Becker et al.

(10) Patent No.: US 10,311,530 B2
(45) Date of Patent: Jun. 4, 2019

(54) SYSTEM AND PROCESS FOR MANAGING PREPARATION AND PACKAGING OF FOOD AND/OR BEVERAGE PRODUCTS FOR A PRECISE DELIVERY TIME

(71) Applicant: Nourish Technology Inc., Chicago, IL (US)

(72) Inventors: Greg Becker, Chicago, IL (US); Federico Bana Mullin, Montevideo (UY); Patrick O'Brien, Chicago, IL (US); James Barnes, San Francisco, CA (US); Scott Lessans, San Francisco, CA (US); Fabian Silva, Montevideo (UY)

(73) Assignee: Nourish Technology Inc., Chicago, IL (US)

( * ) Notice: Subject to any disclaimer, the term of this patent is extended or adjusted under 35 U.S.C. 154(b) by 278 days.

(21) Appl. No.: 15/217,314

(22) Filed: Jul. 22, 2016

(65) Prior Publication Data

US 2018/0025445 A1 Jan. 25, 2018

(51) Int. Cl.
| | |
|---|---|
| *G06Q 50/12* | (2012.01) |
| *G06Q 30/06* | (2012.01) |
| *G06Q 20/20* | (2012.01) |
| *H04W 4/02* | (2018.01) |

(52) U.S. Cl.
CPC ........... *G06Q 50/12* (2013.01); *G06Q 20/202* (2013.01); *G06Q 30/0635* (2013.01); *H04W 4/027* (2013.01)

(58) Field of Classification Search
USPC .......................................................... 705/15
See application file for complete search history.

(56) References Cited

U.S. PATENT DOCUMENTS

| | | | |
|---|---|---|---|
| 6,976,004 | B2 | 12/2005 | Wittrup |
| 9,177,451 | B2 | 11/2015 | Calman |
| 2003/0158790 | A1 | 8/2003 | Kargman |
| 2005/0222906 | A1 | 10/2005 | Chen |
| 2006/0184404 | A1 | 8/2006 | Scott et al. |
| 2007/0294129 | A1 | 12/2007 | Froseth et al. |
| 2009/0216569 | A1 | 8/2009 | Bonev et al. |
| 2010/0293106 | A1 | 11/2010 | Rhoads et al. |
| 2012/0191603 | A1* | 7/2012 | Nuzzi ................ G06Q 20/102 705/40 |
| 2012/0306659 | A1 | 12/2012 | Ben-Dayan |
| 2013/0103452 | A1* | 4/2013 | Burks .................. G06Q 10/06 705/7.25 |

(Continued)

*Primary Examiner* — Garcia Ade
(74) *Attorney, Agent, or Firm* — Stradley Ronon Stevens & Young, LLP

(57) ABSTRACT

The disclosure relates to a computer-based system for managing just-in-time preparation and delivery of food products. In the system, customers can build, place, and pay for their order. Once the order is placed, the system will track the users location, only starting to prepare their food when the customer is within a specific proximity to the retail location. The proximity will be dynamic and expand and contract with the customer's movements. Finally, the system will coordinate the preparation, assembly and packaging of the order to provide just-in-time delivery of the customer's order, thereby reducing food waste and enhancing the freshness and taste of the product delivered to improve the customer experience.

14 Claims, 19 Drawing Sheets

(56) References Cited

U.S. PATENT DOCUMENTS

2014/0025524 A1  1/2014  Sims et al.
2015/0379650 A1  12/2015  Theobald
2016/0292664 A1* 10/2016  Gilfoyle ................ G06Q 10/08

* cited by examiner

A Web Page http://  🔍 bBox Logo

Orders That Have Been Placed

26 - BEC, HRC

27 - BE, L/SM

28 - ((2))BEC, 2ESP

29 - Double Bacon, EC

30 - BE - NO CHEESE

31 - 2x Coffee

Accepting Orders

Logout

What You Should be Making Now

24 - Bacon, Egg, Cheese, 2x Hot Sauce
Coffee

25 - Bacon, Egg, Hot Sauce - NO CHEESE
Coffee

Pickup Alert

22

23

Completed Orders

| User ID | Name | Total Spend | Total Transactions | Average Spend | Average Transactions/W |
|---|---|---|---|---|---|
| #172 | Greg Becker | $462.71 | 93 | $4.98 | 3.5 |
| #172 | Greg Becker | $462.71 | 93 | $4.98 | 3.5 |
| #172 | Greg Becker | $462.71 | 93 | $4.98 | 3.5 |
| #172 | Greg Becker | $462.71 | 93 | $4.98 | 3.5 |
| #172 | Greg Becker | $462.71 | 93 | $4.98 | 3.5 |
| #172 | Greg Becker | $462.71 | 93 | $4.98 | 3.5 |

Create a User

Export Data

Go Home

FIG. 17

| User ID | Name | Email | Favorited Machine | Favorited Items | Average Rating |
|---------|------|-------|-------------------|-----------------|----------------|
| #172 | Greg Becker | gbecker@greg.com | "Giraffe" | "BEC" | 4.8/5 |
| #172 | Greg Becker | gbecker@greg.com | "Giraffe" | "BEC" | 4.8/5 |
| #172 | Greg Becker | gbecker@greg.com | "Giraffe" | "BEC" | 4.8/5 |
| #172 | Greg Becker | gbecker@greg.com | "Giraffe" | "BEC" | 4.8/5 |
| #172 | Greg Becker | gbecker@greg.com | "Giraffe" | "BEC" | 4.8/5 |
| #172 | Greg Becker | gbecker@greg.com | "Giraffe" | "BEC" | 4.8/5 |

FIG. 18

SYSTEM AND PROCESS FOR MANAGING PREPARATION AND PACKAGING OF FOOD AND/OR BEVERAGE PRODUCTS FOR A PRECISE DELIVERY TIME

CROSS-REFERENCE

A Provisional patent application covering the below described invention was submitted on Jul. 27, 2015, and was assigned application No. 62/197,155. The inventors claim the priority date of said Provisional patent application.

FIELD OF THE INVENTION

The invention relates generally to the field of quick service restaurant (QSR) and any takeout restaurant and casual dining restaurant point of sale (POS) systems. Specifically, the system allows an individual to place an order to be picked up from a retail location, then monitors the individual's location to coordinate the completion of the order with the individuals arrival at the retail location.

BACKGROUND

A QSR is a specific type of restaurant characterized both by its fast food cuisine and minimal formal table service. Examples of different variations on the QSR concept include fast food restaurants (e.g., McDonalds, Wendy's and Burger King), fast casual restaurants (e.g., Chipotle, Panera Bread and Cosi), food trucks, food carts and any restaurant that offers take out service (e.g., Applebee's, Chili's and Outback Steakhouse).

To make quick service possible while ensuring accuracy and security, many QSRs have incorporated POS systems. POS systems are computerized systems typically incorporating registers, computers and peripheral equipment, usually operated on a computer network, to keep track of orders/sales and generate records used in accounting and bookkeeping.

POS systems have revolutionized the restaurant industry, particularly in the QSR sector. In most POS systems, orders and payments are submitted via registers. Registers are computers, sometimes with touch screens. The registers operate with a computer network which connects to a primary server, often referred to as a "store controller" or a "central control unit". Printers and monitors can also be placed on the store network to assist in the preparation and assembly of the relevant food and/or beverage products. For the purpose of this disclosure beverages are to be considered food products.

In the QSR industry, registers may be at the front counter, or configured for drive-through or walk-through cashiering and order taking. This makes it possible for a kitchen crew to view orders placed at a front counter or drive through display in real time and accordingly prepare and assemble the relevant food and/or beverage product requested. Front counter registers allow taking and serving orders at the same terminal, while drive-through registers allow orders to be taken at one or more drive-through windows and cashiered or served at another. In addition to registers, the POS system permits drive-through and kitchen monitors to display orders to assist store staff in the preparation and assembly of customer orders.

Typically, once an order is placed by the customer at a register, the order appears on the kitchen monitor for preparation and assembly. When the food and/or beverage product is assembled it is delivered to the customer and the relevant order may be stored, deleted or recalled by a touch interface or a bump bar. Drive-through systems operate in a similar fashion, but may be enhanced by the use of wireless (or headset) intercoms to assist the customer in conveying their order to the register.

Such systems provide decreased service times and increased efficiency of orders in the QSR industry. However, in the QSR setting, customer places the order upon arrival at the restaurant, and as a result must wait while the food and/or beverage product is prepared.

In an attempt to minimize the customer wait, QSRs typically precook, premix or prefreeze certain components of the food and/or beverage product and store those components in warmers. However, the time that the components spend in the warmers negatively impacts the palatability of the components. Consequently, the customer will experience a discernible less-than-appealing texture and taste of the food and/or beverage product. The QSRs will also suffer food waste as the components cannot be kept in the warmers indefinitely because as food sits out bacteria forms. The longer food sits out the more bacteria forms on the food eventually requiring disposal of components. Human error can sometimes result in such bacteria infested food being served; leading to food-borne illnesses.

To address such issues, QSRs have started to permit third party servers to connect to store networks to place orders remotely from the retail location. This permits customers to use their computer or mobile device as a register to place their orders with the QSR prior to arriving at the retail location. Upon submission, the customer's order is conveyed to the QSR's kitchen monitor for assembly. The customer then proceeds to the QSR to retrieve their order. However, the current system is not intelligent beyond that single time input. Therefore, if a customer is running late or arriving early, present systems have no way of adjusting.

Furthermore, just as the QSR lacks knowledge of when a customer will arrive, the customer lacks knowledge of the specific time their order will be ready. As a result, even if the customer places the order for a specific pickup time the customer will typically arrive before or after their food and/or beverage product order is prepared. If the customer arrives before their order is assembled, they must wait. Conversely, if the customer arrives after their order is assembled the food and/or beverage product may have cooled and the taste and/or texture will suffer, negatively impacting the customer's experience.

Furthermore, the below invention can also be utilized by a casual dining restaurant (e.g., Cheesecake Factory®) to increase: (1) service efficiencies, (2) table utilization and (3) the customer experience. The casual dining restaurant can use the invention to monitor a customer's progress so that as soon as the customer arrives they are seated and their food and/or beverage order is brought to them within a short time.

As a result, there is a need to bridge the gap between the customer's private knowledge of their current location and speed at which they are approaching the QSR/Restaurant and the QSR/Restaurant's private knowledge of the time it takes to prepare and assemble the customer's order to deliver dynamic preparation, packaging for just-in-time (JIT) delivery of the customer's order upon the customer's arrival at the retail location.

Illustrative and alternative embodiments of a computer-based system for bridging the gap between the customer's private knowledge of their current location and speed at which they are approaching the QSR/Restaurant and the QSR/Restaurant's private knowledge of the time it takes to prepare and assemble the customer's order are described in detail with reference being made to the figures of this application.

The system comprises a computer processor, a storage device for storing data, a real-time positioning system device, a display, a customer file, and a food product order file. The customer enters their food and/or beverage product order, selected from menus contained on the storage device, which is accessed by the processor and transmitted to the display. Once selected, the food and/or beverage product order is transmitted to the processor, which records the order in the food product order file, and transmits it to the retail location. Concurrently, the customer file, which can be the same file as the food order file, records the physical location of the customer with the assistance of the real-time location system and transmits that data at set intervals or continuously to the processor. The processor accesses the storage device to determine the time the customer's order will take to prepare. From the location data, the processor determines and continuously monitors and updates a customer's estimated time of arrival at the retail location. When the processor determines that the estimated order preparation time is the same as the customer's estimated time of arrival, within a certain degree of tolerance, the processor transmits an alert to the retail location to commence preparation and packaging of the customer's order to accomplish JIT delivery of the order.

The method and non-transitory computer readable medium integrated within the system is comprised of first determining the location of an individual with a real-time location system. Next, accessing the storage medium to determine relevant retail locations and presenting the individual with menus containing food and/or beverage products available at the retail location on the display. The individual can request or preselect alternate retail locations and/or food and/or beverage products based on specific preferences. The individual interfaces with the display to place an order which is transmitted to the processor. The processor stores the order in the food order file and conveys the order to the retail location. Using the real-time location system to identify the individual's starting location and the speed at which the individual is approaching the retail location, the processor determines the individual estimated time of arrival ("ETA") at the retail location. The processor determines the time the order will take to prepare and package. From the speed at which the individual is approaching the retail location and the time the order will take to prepare, the processor identifies a distance, from the retail location, that the individual will traverse in the time the order will take to prepare (i.e., proximity threshold). The proximity threshold is not static and the processor continues to update it at set intervals or continuously via the continued monitoring of the individual's physical location. When the individual crosses the proximity threshold, the retail location is alerted to commence preparation of and accept payment for the order. The retail location is also alerted when the individual arrives. Finally, delivery of the order is confirmed.

These and other features, aspects and advantages of the present invention will become better understood with reference to the following description and appended claims.

BRIEF DESCRIPTION OF THE FIGURES

Additional aspects, features, and advantages of the invention, as to its system, structure components, configuration and operability will be understood and become more readily apparent when the invention is considered in light of the following description of the figures made in conjunction with the accompanying drawings, wherein:

FIG. 16 shows one embodiment of the kitchen display at a retail location for the system.

FIG. 17 shows one embodiment of a display of captured data for the system.

FIG. 18 shows one embodiment of a display of captured data for the system.

DETAILED DESCRIPTION

Figure 1:
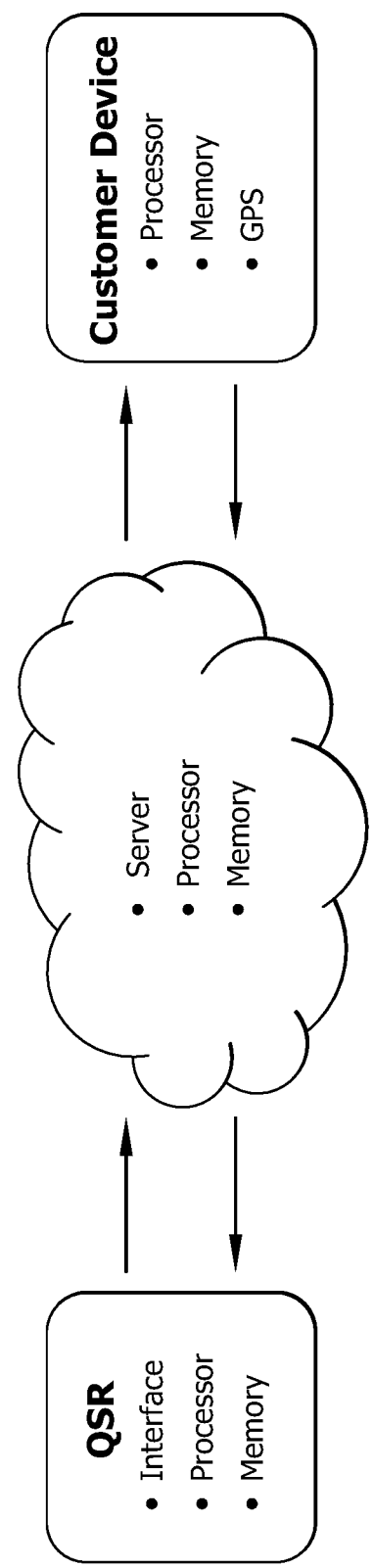
FIG. 1 shows the flow of information between components of the general system.
Figure 2:
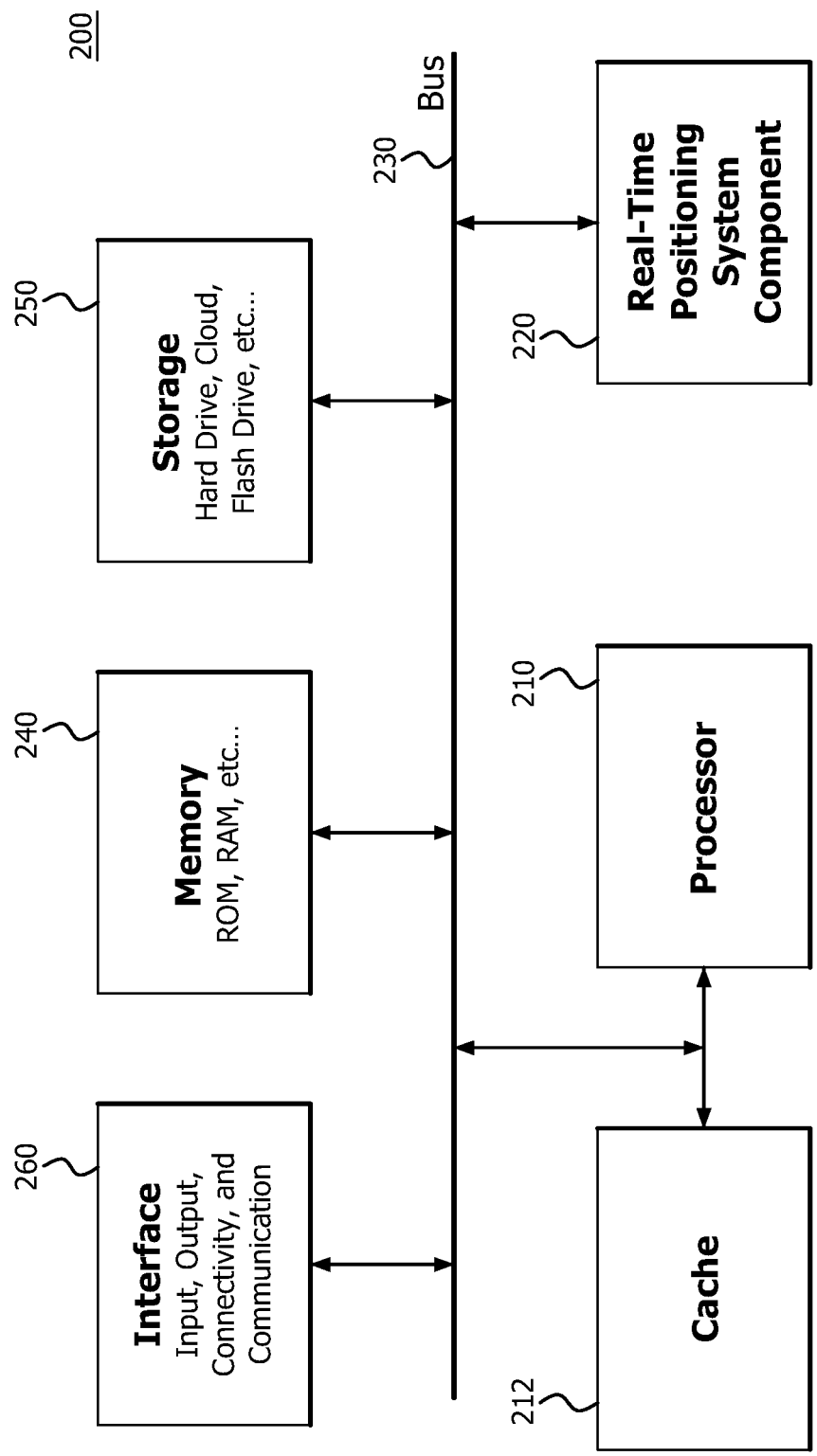
FIG. 2 shows the hardware components of the general system.

Various embodiments of the invention are described in detail below. Although specific implementations are described, it should be understood that this is done for illustration purposes only. A person skilled in the relevant art will recognize that other components and configurations may be used without parting from the spirit and scope of this disclosure.

The present invention addresses the need in the art for systems, techniques and methods for managing JIT preparation, assembly, packaging and delivery of freshly prepared food and/or beverage products. Allowing a retail location to deliver freshly prepared food for a customer upon arrival at the retail location. This integration works by using geolocation to track the user. The system will intake all placed orders, and determine what orders need to be started, and when. Just because a customer orders first, doesn't mean their order is ready first. It is all based on who is expected to arrive at the retail location first.

Consumers will interact (order, pay, etc.) through a web-connected device. There will be no need to utilize the ordering interface at the retail location. Using the system, customers can build, place, and pay for their order. Once placed, the system will track the users location, only starting to prepare their food when the users are close to their selected retail location. When close, the system will notify the retail location to begin prepping, cooking, and assembling the customer's order. When a user arrives the retail location will be notified A detailed discussion of the methods and systems surrounding the invention of managing JIT preparation, assembly, packaging and delivery of food and/or beverage products is provided below. First, a basic system overview is discussed. Next, an outline of the system components is discussed. A description of a cloud computing system, the preferred environment of the system, is then disclosed. A detailed example of the submission, preparation, assembly and delivery of a food order follows. The collection and retention of relevant data is outlined. Finally, the incorporation of additional parameters to the system is delineated.

SYSTEM OVERVIEW

The system:
(A) uses a processor to call up a list of relevant retail locations;
(B) receives a customer order placed using:
  (1) a software application operating on (a) a mobile computer device (e.g., cellphone smartphone, tablet, laptop computer, or wearable computer device such as a smartwatch, etc.) that has a real time positioning system component (e.g., GPS, Wi-Fi Bluetooth, etc.) or (b) a computer device (e.g., laptop or desktop computer) that is synced with a mobile computer device that has a real time positioning system component that can be enabled, or
  (2) a website accessed by a mobile computer device or a computer device having a registered customer credentials that are synced to a software application operating on a unique mobile computer device (cellphone, smartphone, tablet, laptop computer, etc.) that has a real time positioning system component that can be enabled,
  whereby the mobile computer device and the computer device are configured to communicate with a remote server (e.g., at a retail location or a location remote to the retail location) of the system using wired and/or wireless communication networks (e.g., cellular, Wi-Fi, LAN, WAN, satellite-based, etc.)
(C) uses a processor to call up a predetermined preparation time for the order or its components from a database;
(D) actively monitors the real-time location of the customer (from time of order through to arrival of customer at the retail location) using the real time positioning system component;
(E) compares (1) the preparation time for the order to (2) the customer's travel time from the place of order to the retail location based on real-time positional data related to the customer;
(F) notifies the retail location, by communicating with a wired or wireless communication network to a computer device at the retail location, to begin preparing the ordered food and/or beverage product(s) when the real-time location of the customer relative to the retail location equals the preparation time for the order within an acceptable tolerance, which may be configured by considering additional environmental data (e.g., traffic for both private and public transportation, weather conditions in which the customer is travelling, other customer orders queued in the system, etc.); and
(G) notifies the retail location when the customer arrives at the retail location to pick up the completed order, based on active monitoring of the customer's real time location using the real time positioning system component.

As disclosed in FIG. 1, the system includes a server comprising a processor aided by memory that communicates with a database. The database(s) containing retail locations and/or predetermined food preparation times can be physically located at the retail location or at a remote location.

When the customer accesses the system, relevant retail locations stored in a database are accessed by the server and transmitted to the customer's computer device or mobile computer device for display. The retail locations can be directly uploaded to the database by the owners, employees or agents of retail locations, third parties or culled from relevant public database and/or websites (e.g., Google Maps®, which is a registered trademark of Google Inc.). The customer then selects which retail location (s)he wishes to place an order with.

The server can receive an order and payment from a customer's computer devices, including mobile computer devices, and communicates the order to a retail store computer. The server also continuously monitors the real-time position of the customer using a real time positioning system component.

Examples of real time positioning system components are GPS, Wi-Fi enabled real time tracking, Bluetooth, and Near Field Communication. Such systems can provide the location data necessary to monitor the real-time position of the customer. When an order is placed, the real time positioning system component determines the customer's location at set intervals or continuously and the computer device transmits the customer's location data to the server. The server determines the customer's ETA at the retail location based on the customer's location data. The customer's ETA is then compared to a database containing predetermined food preparation times.

The information contained on the database related to food and/or beverage product preparation time can be uploaded by owners, employees or agents of the retail location or a third party. When an order is placed, the server receives the order and transmits it to the retail location. The server then compares the customer's ETA with the preparation time of the food components of the order to determine when the retail location should be notified to start preparation of the customer's order.

The server continuously monitors the customers location. When the ETA of the customer to the retail location equals the preparation time for the order within an acceptable tolerance the server transmits a notification to the retail location to begin preparing the customer's ordered food and/or beverage product(s). When the customer arrives at the retail location, the server transmits a notification to the retail location that the customer has arrived and the retail location for delivery of the order.

SYSTEM COMPONENTS

A system 200 includes a general-purpose computing device, including a processing unit (CPU or processor) 210, a real-time positioning device 220 and a system bus 230 that couples various system components including the system memory 240 such as read only memory (ROM) and random access memory (RAM) to the processor 210. The system can include a storage device 250 connected to the processor 210 by the system bus 230. The system can include interfaces 260 connected to the processor by the system bus. The system can include a cache 212 of high speed memory connected directly with, in close proximity to, or integrated as part of the processor 210. The system can copy data from the memory 240 and/or a storage device 250 to the cache 212 for quick access by the processor. In this way, the cache 212 provides a performance boost that avoids processor delays while waiting for data. These and other modules stored in the memory 240, storage device 250 or cache 212 can control or be configured to control the processor 210 to perform various actions. Other system memory may be available for use as well. The memory 240 can include multiple different types of memory with different performance characteristics.

Computer Processor

It can be appreciated that the invention may operate on a computing device with more than one processor or on a group or cluster of computing devices networked together to provide greater processing capability. The processor can include any general purpose processor and a hardware module or software module, stored in an external or internal storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

For clarity of explanation, an illustrative system embodiment is presented as including individual functional blocks including functional blocks labeled as a "processor". The functions such blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors may be provided by a single shared processor or multiple processors and use of the term "processor" should not be construed to refer exclusively to hardware capable of executing software. Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Real-Time Positioning System Component

The real-time positioning system component can be a global positioning system (GPS) component used to identify the current geographic location of the individual and/or computer system as well as its location in relation to another location (e.g., the retail location). GPS information can be displayed by the system. For example, a map may be displayed on the mobile device and as outlined below directions to the retail location may be provided to the customer. The GPS information may be supplemented by other information, such as nearby wireless networks, to determine the current location of the mobile device. For example, in certain embodiments, the mobile device may identify its current location by sensing and/or identifying nearby Wi-Fi networks. The mobile device may be able to identify the geographic location of such Wi-Fi networks and thus, identify its own location based on which Wi-Fi networks it detects and its proximity to the Wi-Fi networks (i.e., Wi-Fi enabled real time tracking).

System Bus

The system bus may be any of several types of bus structures including a memory bus or memory controller, a peripheral bus, and a local bus using any of a variety of bus architectures. A basic input/output (BIOS) stored in ROM or the like, may provide the basic routine that helps to transfer information between elements within the computing device, such as during start-up.

Storage Device

The computing device can further includes a storage device such as a hard disk drive, a magnetic disk drive, an optical disk drive, a solid state drive, a tape drive or the like. Similar to the system memory, a storage device may be used to store data files, such as location information, menus, software, wired and wireless connection information (e.g., information that may enable the mobile device to establish a wired or wireless connection, such as a USB, Bluetooth or wireless network connection), and any other suitable data. Specifically, the storage device and/or the system memory may store code and/or data for carrying out the disclosed techniques among other data.

In one aspect, a hardware module that performs a particular function includes the software component stored in a non-transitory computer-readable medium in connection with the necessary hardware components, such as the processor, bus, display, and so forth, to carry out the function. The basic components are known to those of skill in the art and appropriate variations are contemplated depending on the type of device, such as whether the device is a small, handheld computing device, a desktop computer, or a computer server.

Although the preferred embodiment described herein employs cloud computing and cloud storage, it should be appreciated by those skilled in the art that other types of computer readable media which can store data that are accessible by a computer, such as magnetic cassettes, flash memory cards, digital versatile disks, cartridges, random access memories (RAMS), read only memory (ROM), a cable or wireless signal containing a bit stream and the like, may also be used in the operating environment. Furthermore, non-transitory computer-readable storage media as used herein include all computer-readable media, with the sole exception being a transitory propagating signal per se.

Interface

To enable user interaction with the computing device, an input device represents any number of input mechanisms, such as a microphone for speech, a touch-sensitive screen for gesture or graphical input, keyboard, mouse, motion input, speech and so forth. An output device can also be one or more of a number of output mechanisms known to those of skill in the art such as a display screen, speaker, alarm, and so forth. In some instances, multimodal systems enable a user to provide multiple types of input to communicate with the computing device. The communications interface generally governs and manages the user input and system output. Furthermore, one interface, such as a touch screen, may act as an input, output and/or communication interface.

There is no restriction on operating on any particular hardware arrangement and therefore the basic features here may easily be substituted for improved hardware or firmware arrangements as they are developed.

Software Operations

The logical operations of the various embodiments disclosed are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module. For example, if a storage device contains modules configured to control the processor. These modules may be loaded into RAM or memory at runtime or may be stored as would be known in the art in other computer-readable memory locations. Having disclosed some components of a computing system, the disclosure now turns to a description of cloud computing, which is the preferred environment of the invention.

CLOUD SYSTEM

Cloud computing is a type of Internet-based computing in which a variety of resources are hosted and/or controlled by an entity and made available by the entity to authorized users via the Internet. A cloud computing system can be configured, wherein a variety of electronic devices can communicate via a network for purposes of exchanging content and other data. The system can be configured for use on a wide variety of network configurations that facilitate the intercommunication of electronic devices. For example, each of the components of a cloud computing system can be implemented in a localized or distributed fashion in a network.

Cloud Resources

The cloud computing system can be configured to include cloud computing resources (i.e., "the cloud"). The cloud resources can include a variety of hardware and/or software resources, such as cloud servers, cloud databases, cloud storage, cloud networks, cloud applications, cloud platforms, and/or any other cloud-based resources. In some cases, the cloud resources are distributed. For example, cloud storage can include multiple storage devices. In some cases, cloud resources can be distributed across multiple cloud computing systems and/or individual network enabled computing devices. For example, cloud computing resources can communicate with a server, a database, and/or any other network enabled computing device to provide the cloud resources.

In some cases, the cloud resources can be redundant. For example, if cloud computing resources is configured to provide data backup services, multiple copies of the data can be stored such that the data is still available to the user even if a storage resource is offline, busy, or otherwise unavailable to process a request. In another example, if a cloud computing resource is configured to provide software, the software can be available from different cloud servers so that the software can be served from any of the different cloud servers. Algorithms can be applied such that the closest server or the server with the lowest current load is selected to process a given request.

User Terminals

A user interacts with cloud computing resources through user terminals connected to a network by direct and/or indirect communication. Cloud computing resources can support connections from a variety of different electronic devices, such as servers; desktop computers; mobile computers; handheld communications devices (e.g., mobile phones, smart phones, tablets); set top boxes; network-enabled hard drives; and/or any other network-enabled computing devices. Furthermore, cloud computing resources can concurrently accept connections from and interact with multiple electronic devices. Interaction with the multiple electronic devices can be prioritized or occur simultaneously.

Cloud computing resources can provide cloud resources through a variety of deployment models, such as public, private, community, hybrid, and/or any other cloud deployment model. In some cases, cloud computing resources can support multiple deployment models. For example, cloud computing resources can provide one set of resources through a public deployment model and another set of resources through a private deployment model.

In some configurations, a user terminal can access cloud computing resources from any location where an Internet connection is available. However, in other cases, cloud computing resources can be configured to restrict access to certain resources such that a resource can only be accessed from certain locations. For example, if a cloud computing resource is configured to provide a resource using a private deployment model, then a cloud computing resource can restrict access to the resource, such as by requiring that a user terminal access the resource from behind a firewall.

Service Models

Cloud computing resources can provide cloud resources to user terminals through a variety of service models, such as Software as a Service (SaaS), Platforms as a service (PaaS), Infrastructure as a Service (IaaS), and/or any other cloud service models. In some cases, cloud computing resources can provide multiple service models to a user terminal. For example, cloud computing resources can provide both SaaS and IaaS to a user terminal. In some cases, cloud computing resources can provide different service models to different user terminals. For example, cloud computing resources can provide SaaS to one user terminal and PaaS to another user terminal.

User Interaction

In some cases, cloud computing resources can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources such as servers or database.

Cloud computing resources can provide a variety of functionality that requires user interaction. Accordingly, a user interface (UI) can be provided for communicating with cloud computing resources and/or performing tasks associated with the cloud resources. The UI can be accessed via an end user terminal in communication with cloud computing resources. The UI can be configured to operate in a variety of client modes, including a fat client mode, a thin client mode, or a hybrid client mode, depending on the storage and processing capabilities of cloud computing resources and/or the user terminal. Therefore, a UI can be implemented as a standalone application operating at the user terminal in some embodiments. In other embodiments, a web browser-based portal can be used to provide the UI. Any other configuration to access cloud computing resources can also be used in the various embodiments.

EXAMPLE

Figure 3:
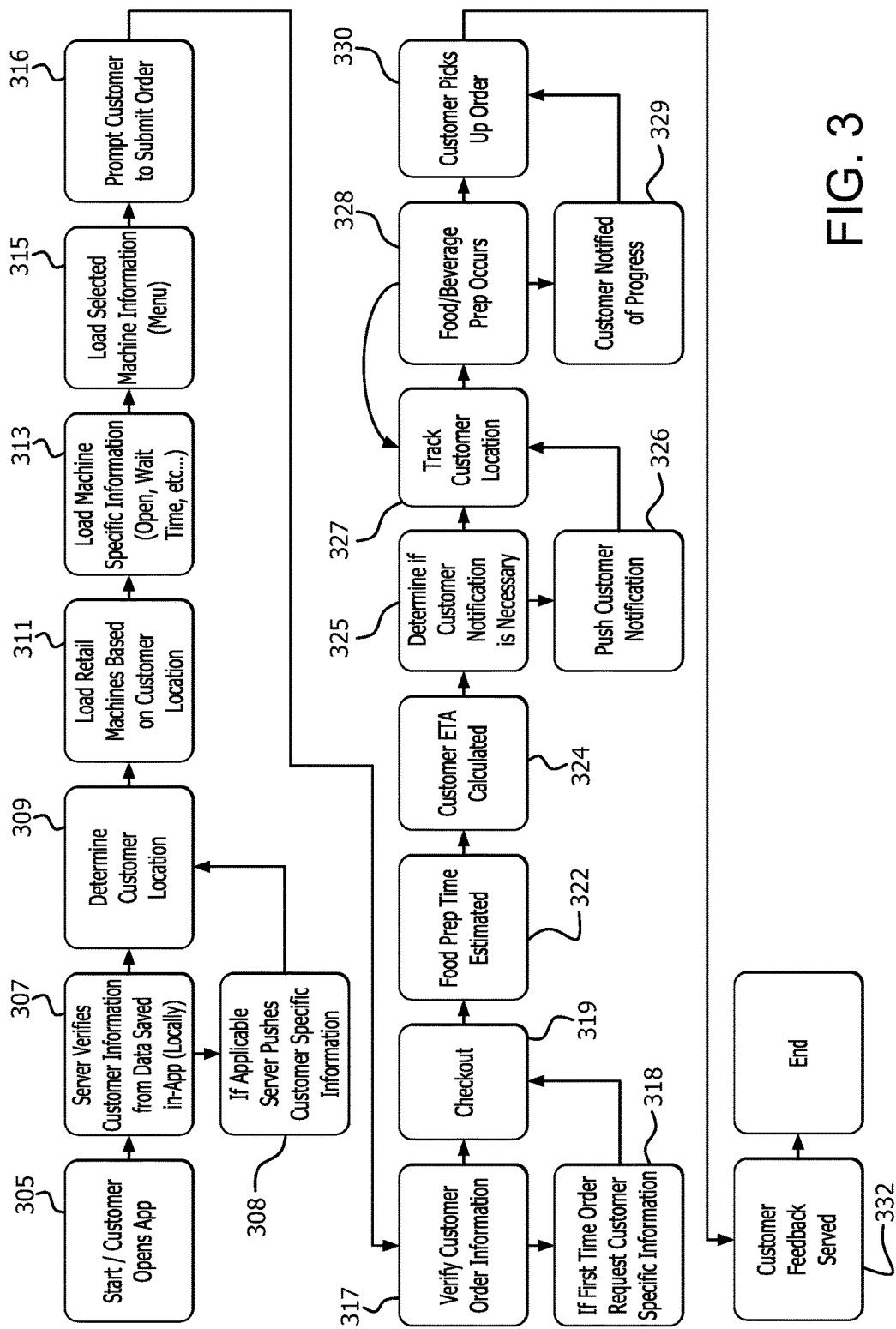
FIG. 3 shows a flow chart for an embodiment of the functionality of the system.
Figure 4:
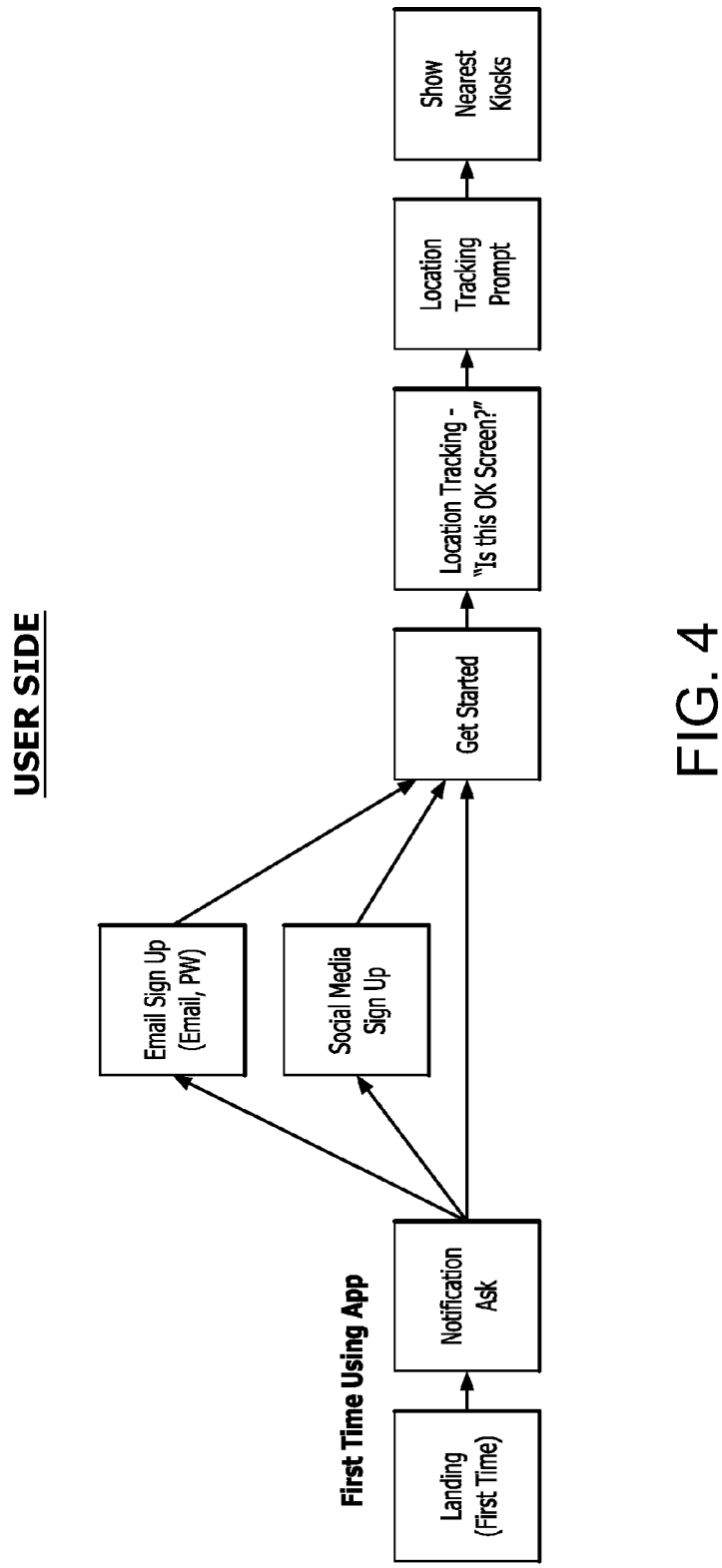
FIG. 4 shows a flow chart of an embodiment of the functionality of the system for a first time user from system startup to displaying the nearest relevant retail location.
Figure 5:
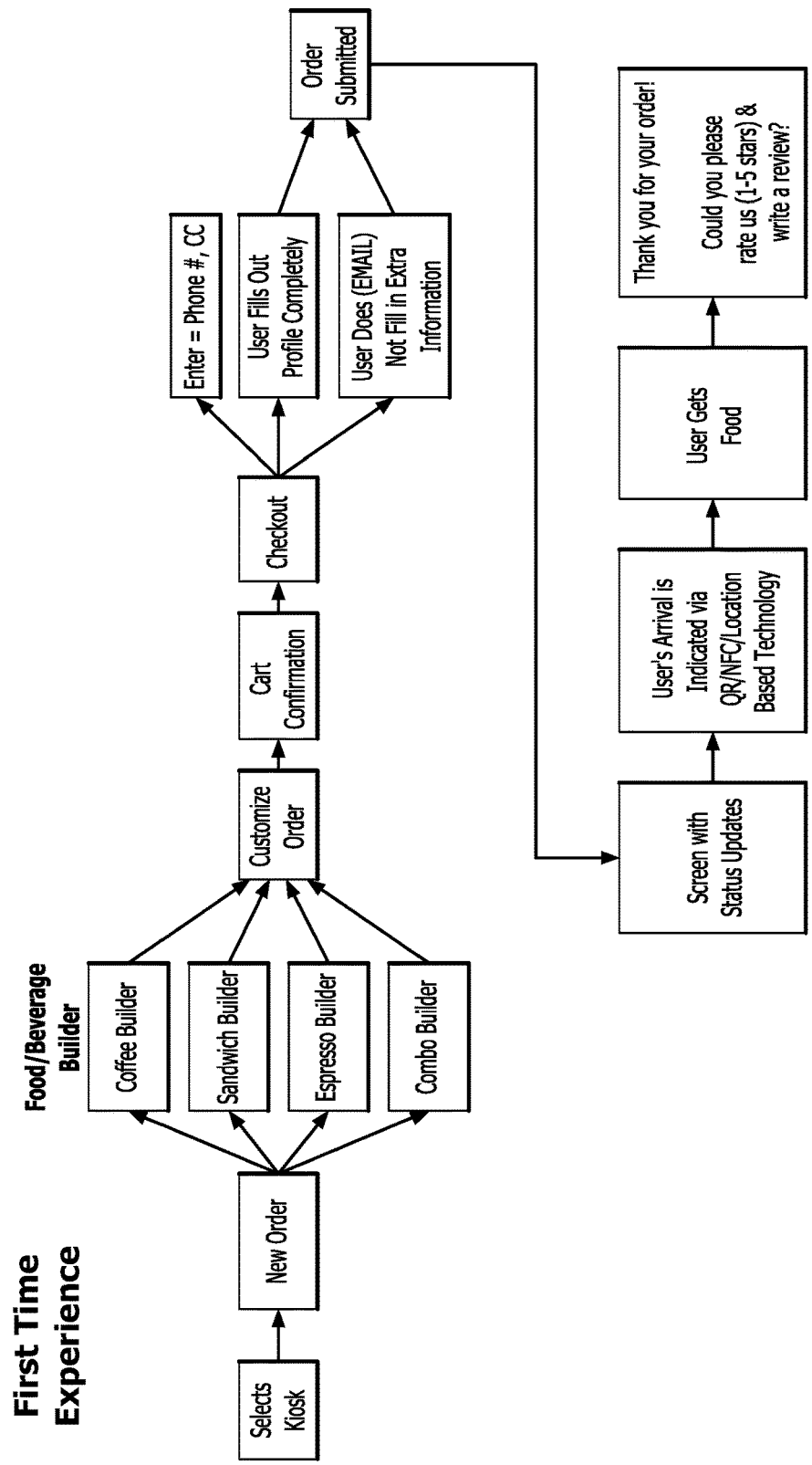
FIG. 5 shows a flow chart of one embodiment of the functionality of the system for a first time user from user selection of a retail location through to order retrieval from the retail location.
Figure 6:
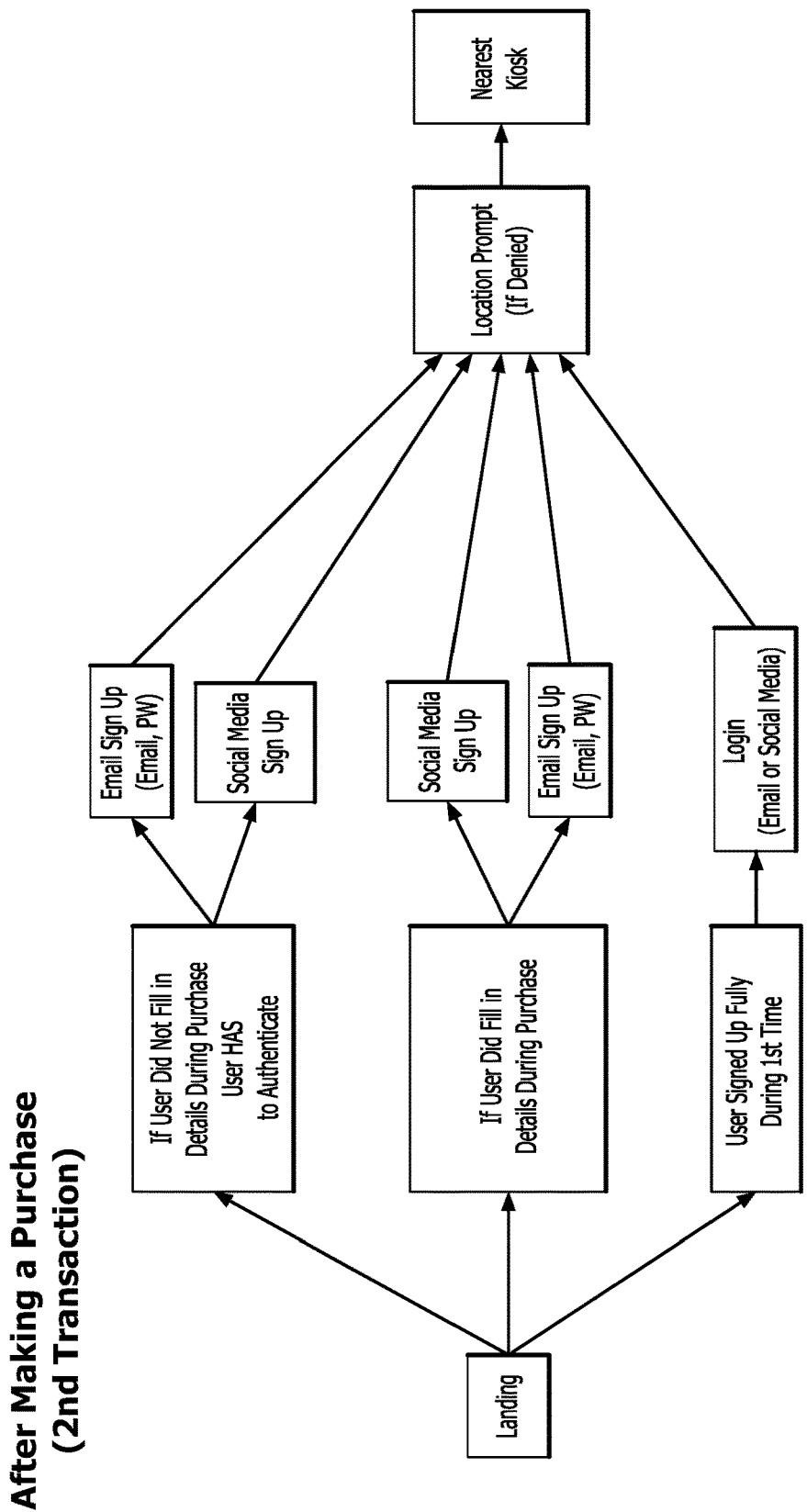
FIG. 6 shows a flow chart of one embodiment of the functionality of the system for a registered user from system startup to displaying the nearest relevant retail location.
Figure 7:
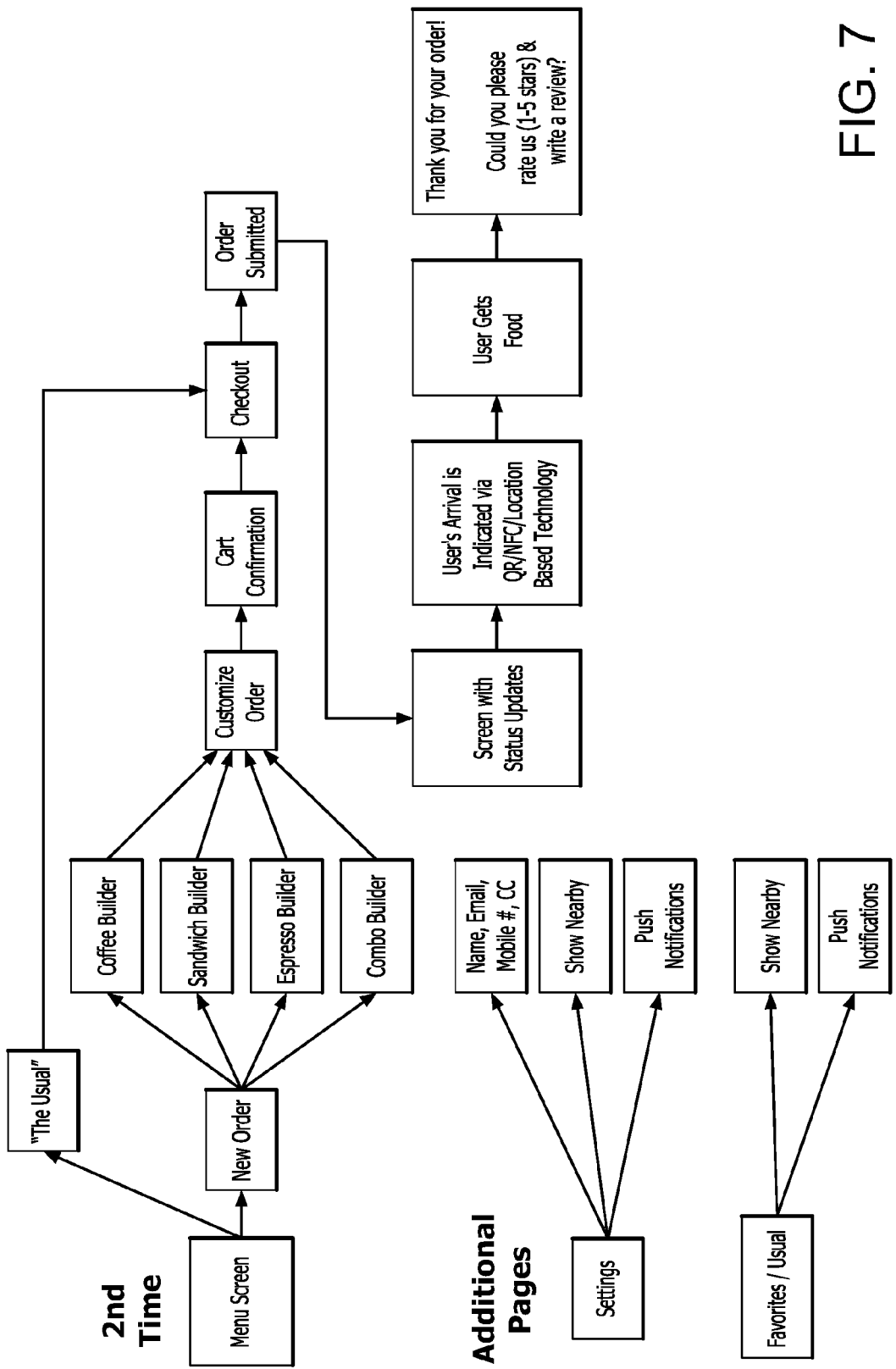
FIG. 7 shows a flow chart of one embodiment of the functionality of the system for a registered user from user selection of a retail location through to order retrieval.
Figure 8:
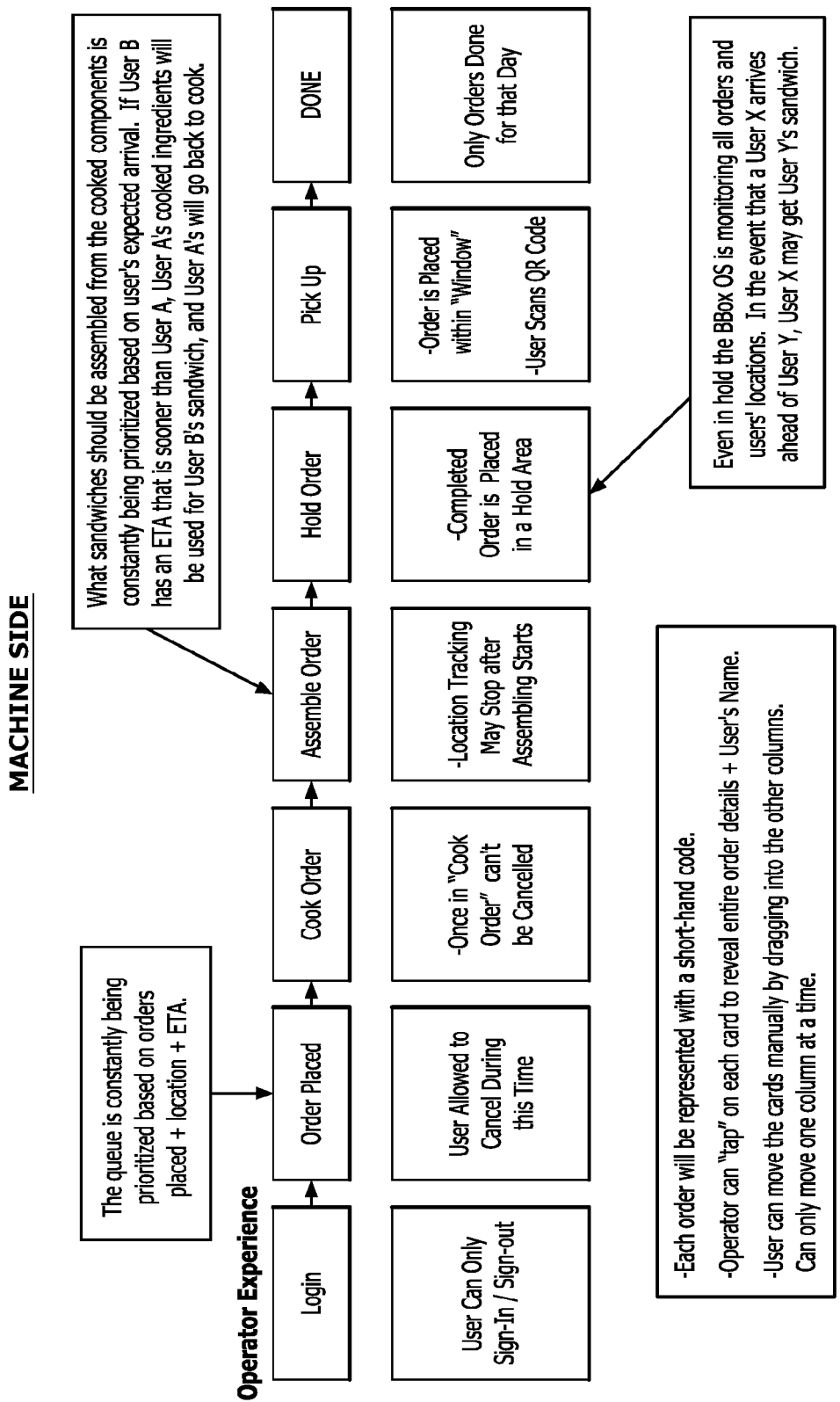
FIG. 8 shows the system flow chart of one embodiment of the disclosed system for a prior user from system start up through order retrieval from the retail location.
Figure 9:
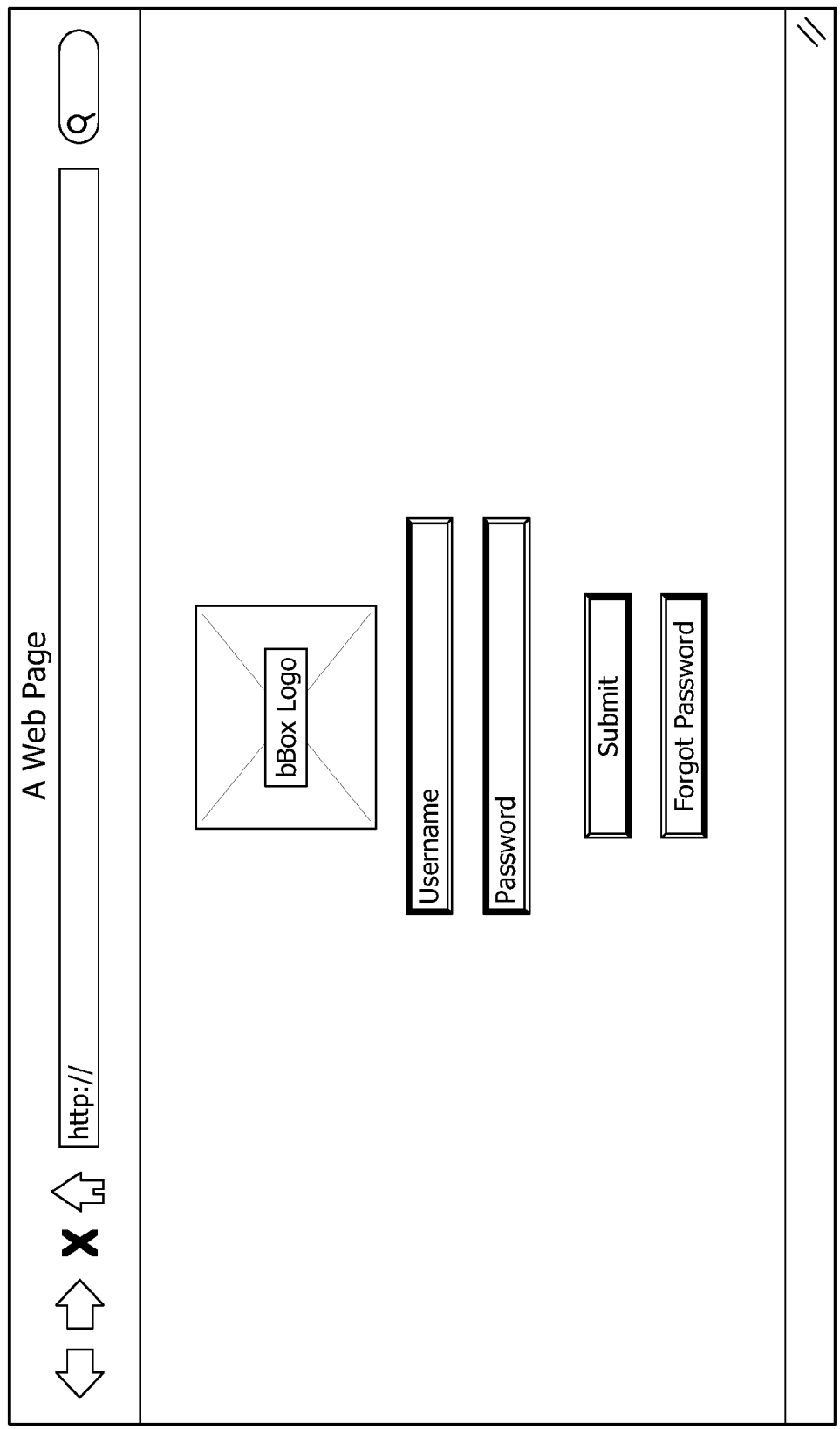
FIG. 9 shows one embodiment of the user login screen to access the system.
Figure 10:
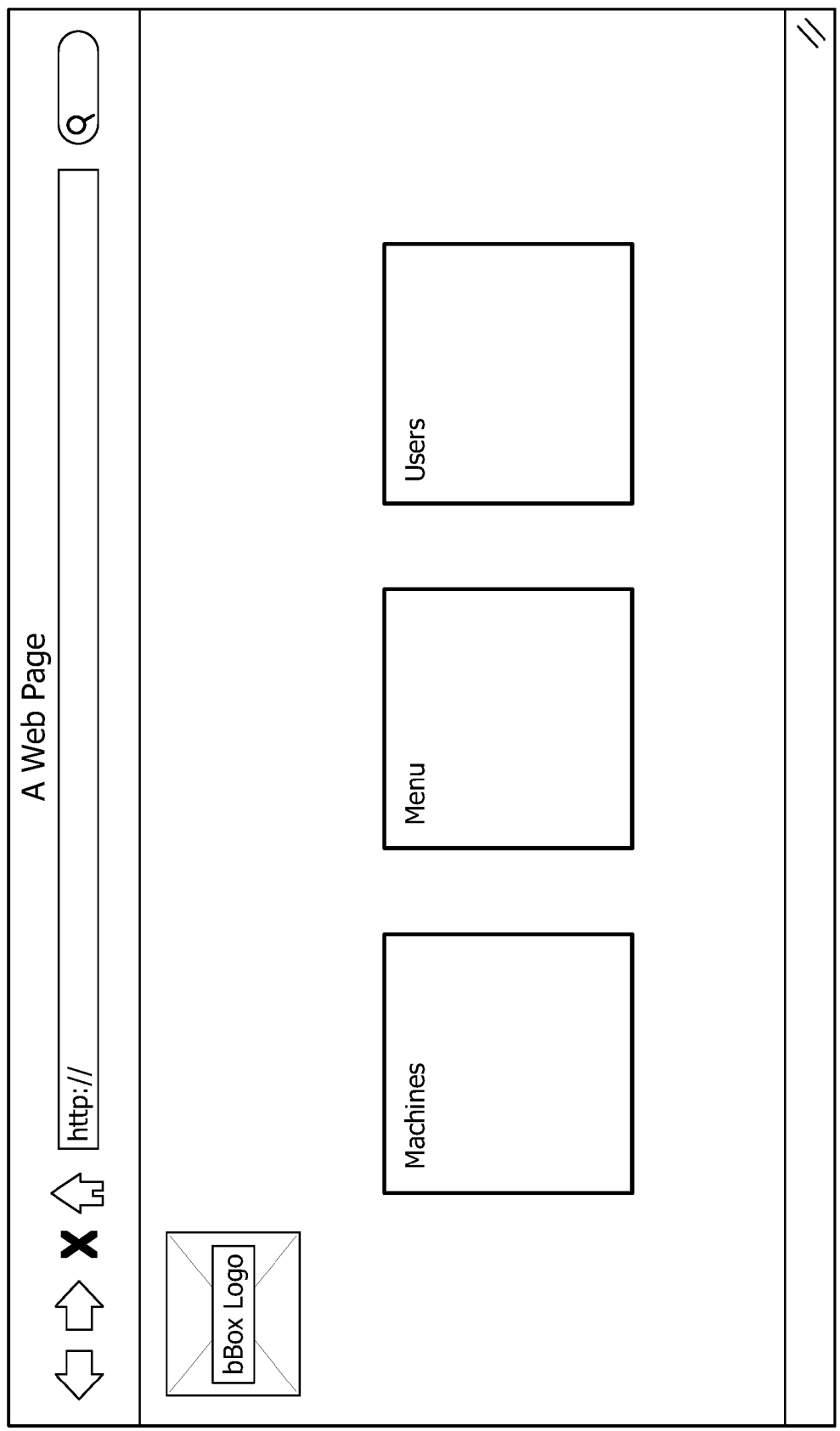
FIG. 10 shows one embodiment of an operator's main menu to access the system.
Figure 11:
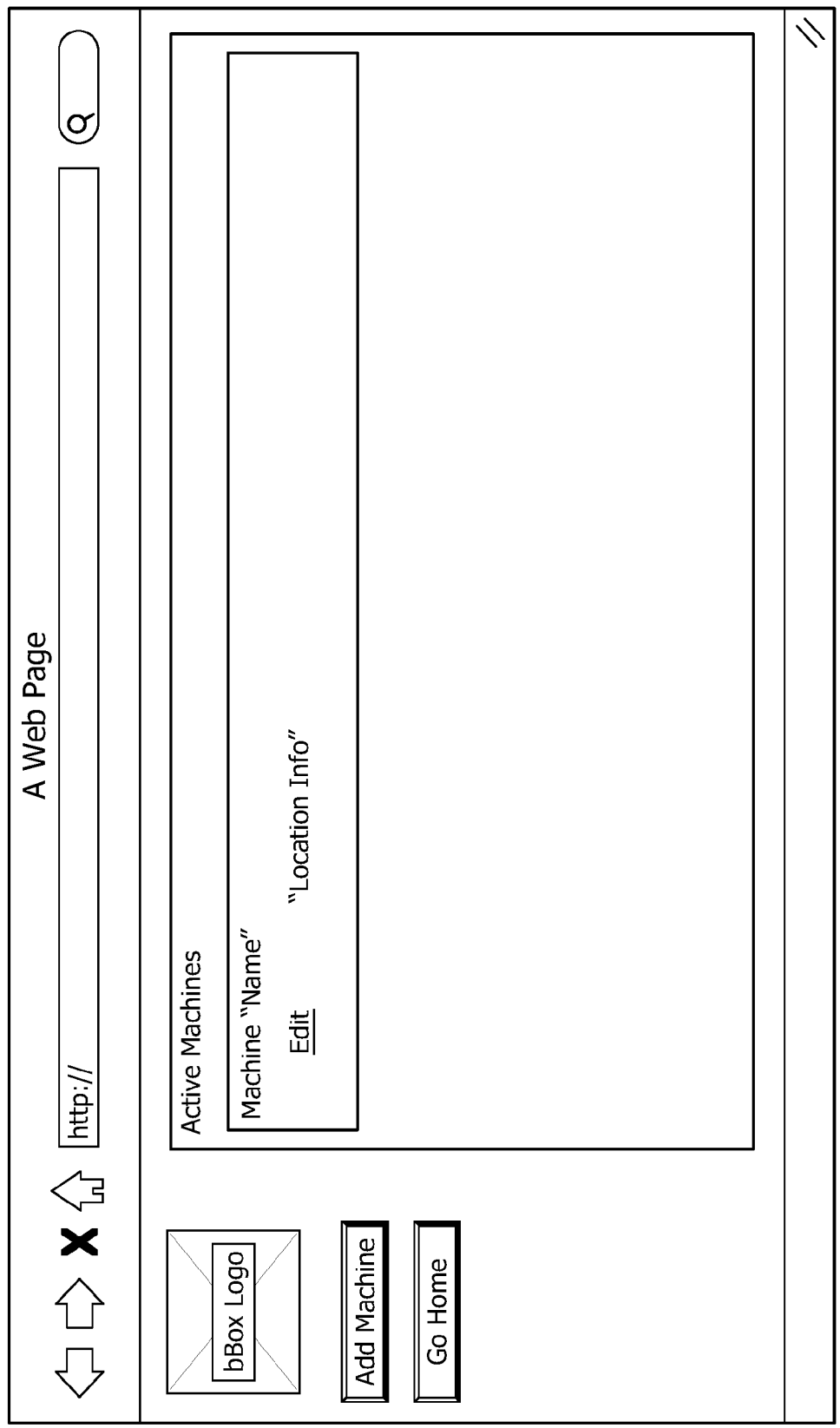
FIG. 11 shows one embodiment of the operator's options to add, revise or delete a specific retail location from the system.
Figure 12:
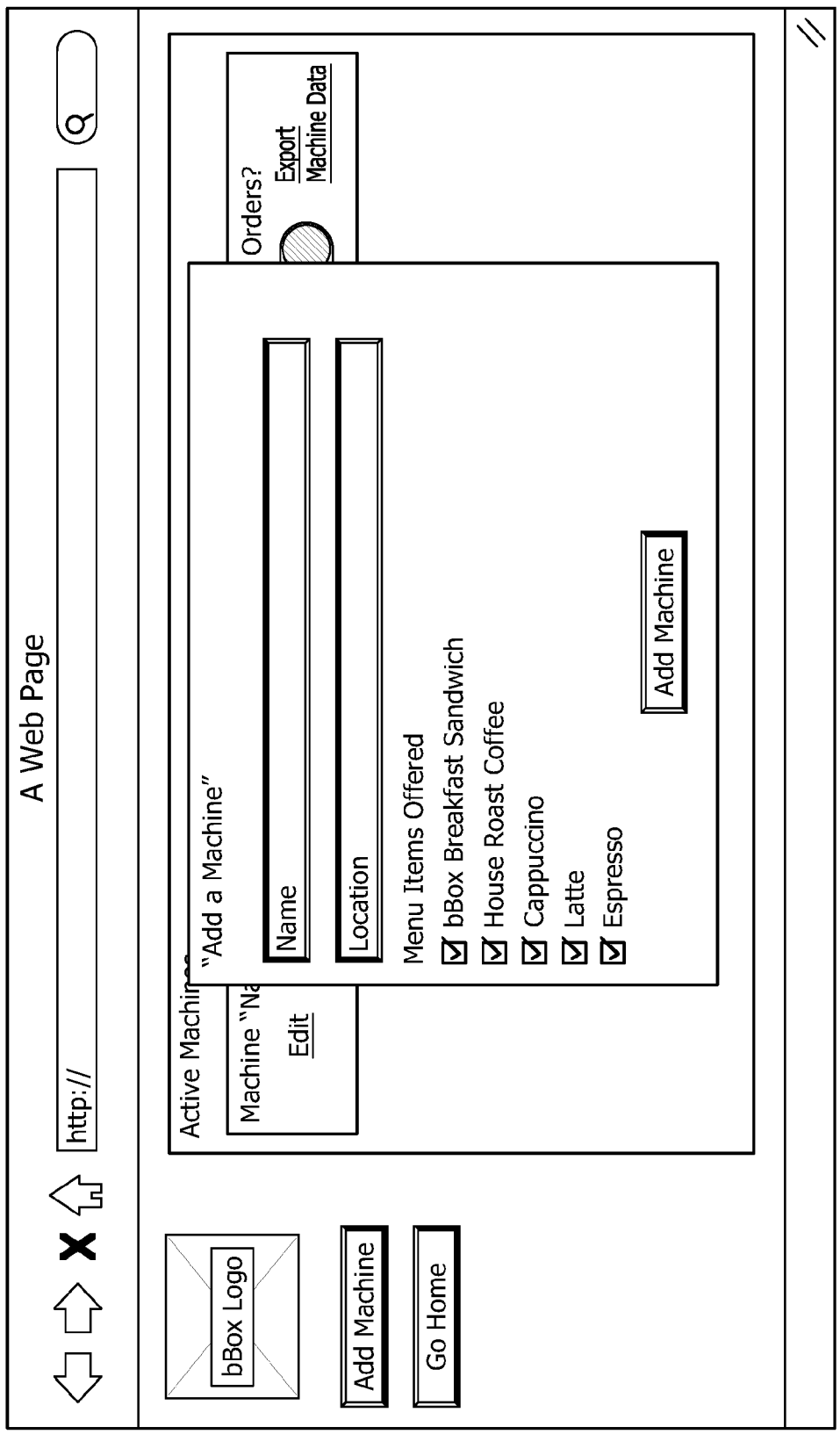
FIG. 12 shows one embodiment of the information that can be input by an operator when adding to, revising or deleting a retail location from the system.
Figure 13:
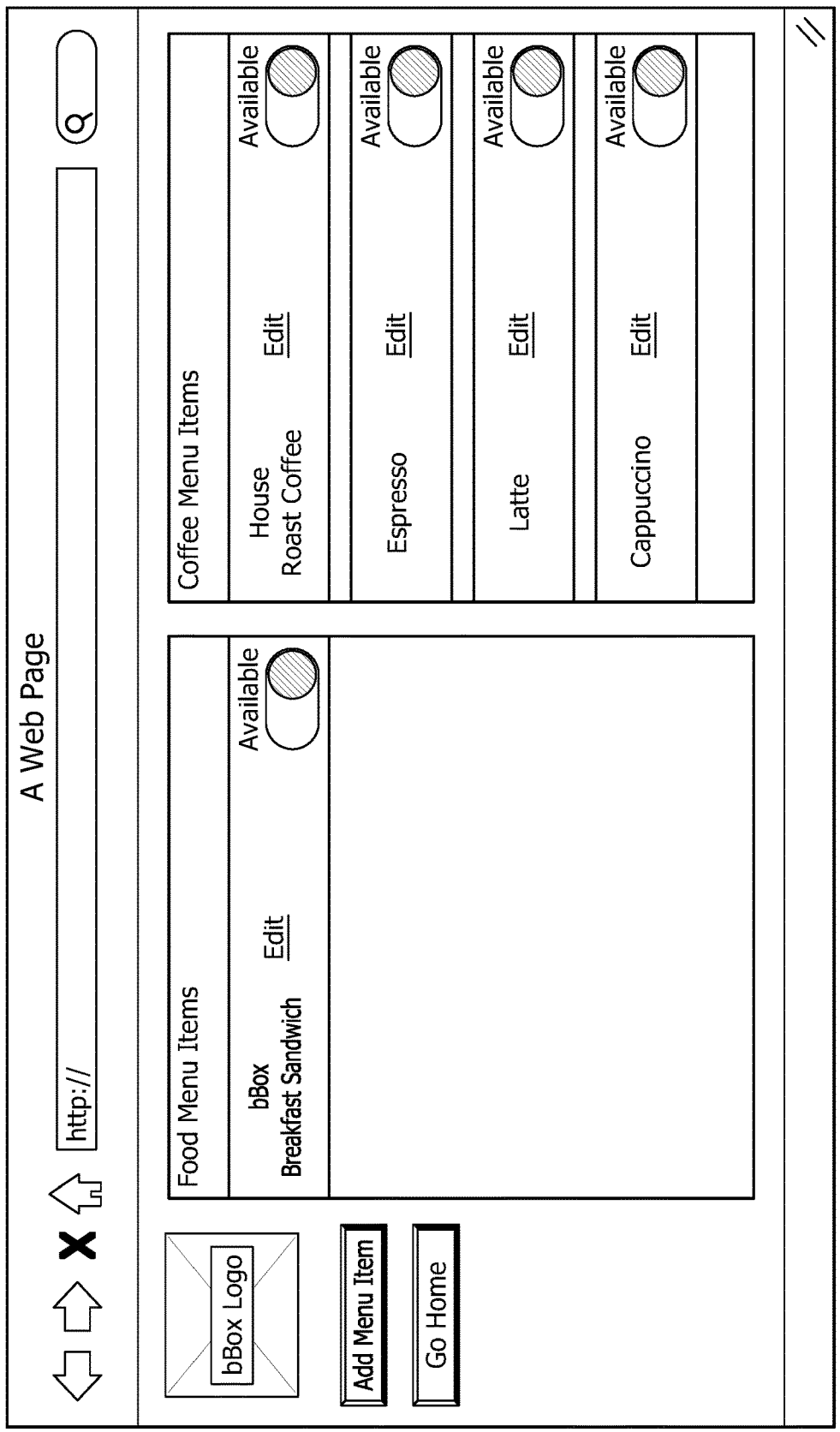
FIG. 13 shows one embodiment of the operator's options to add to, revise or delete a menu offering at a specific retail location for the system.
Figure 14:
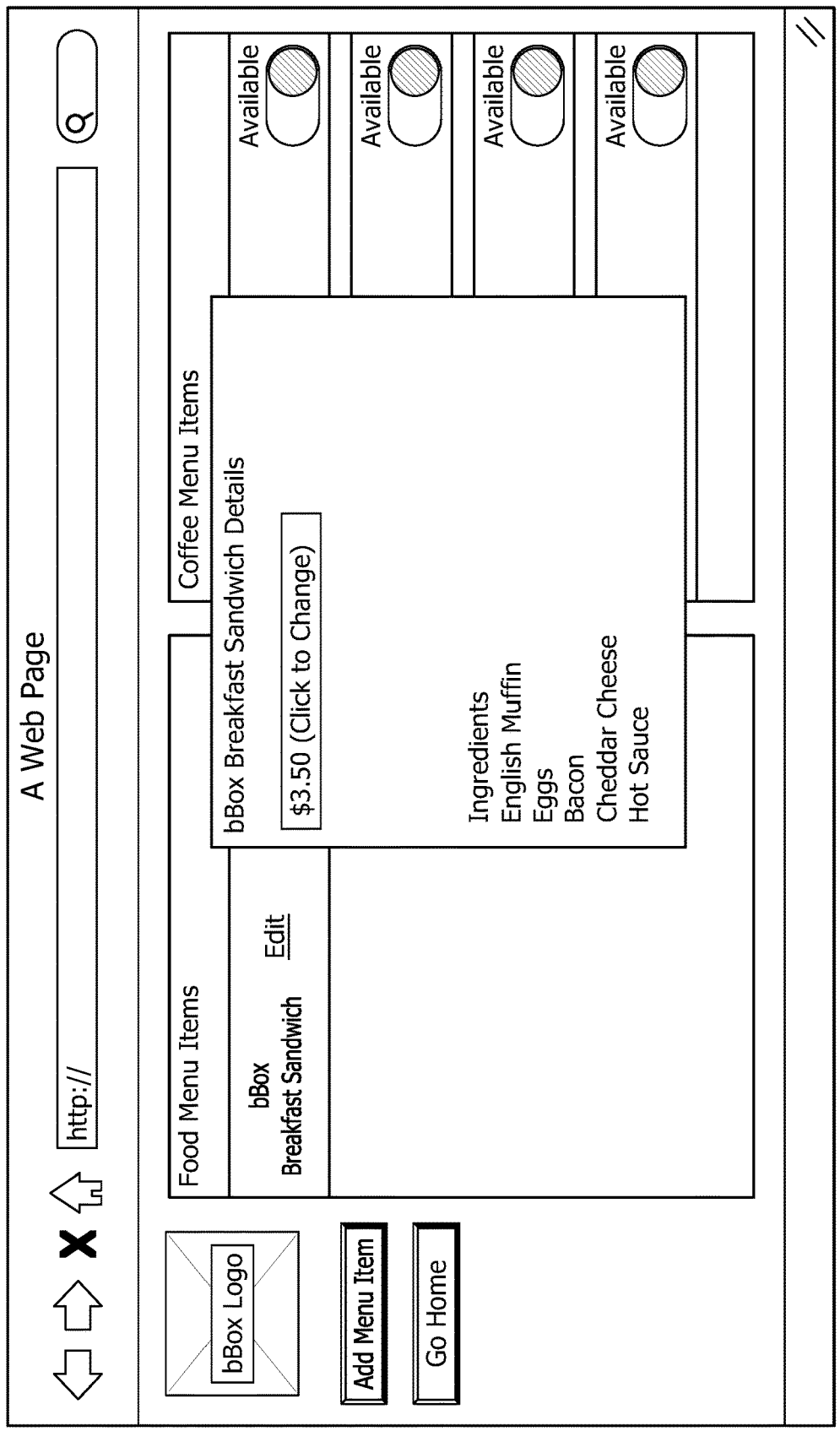
FIG. 14 shows one embodiment of the information that can be input when adding, revising or deleting a menu offering at a specific retail location for the disclosed system.
Figure 15:
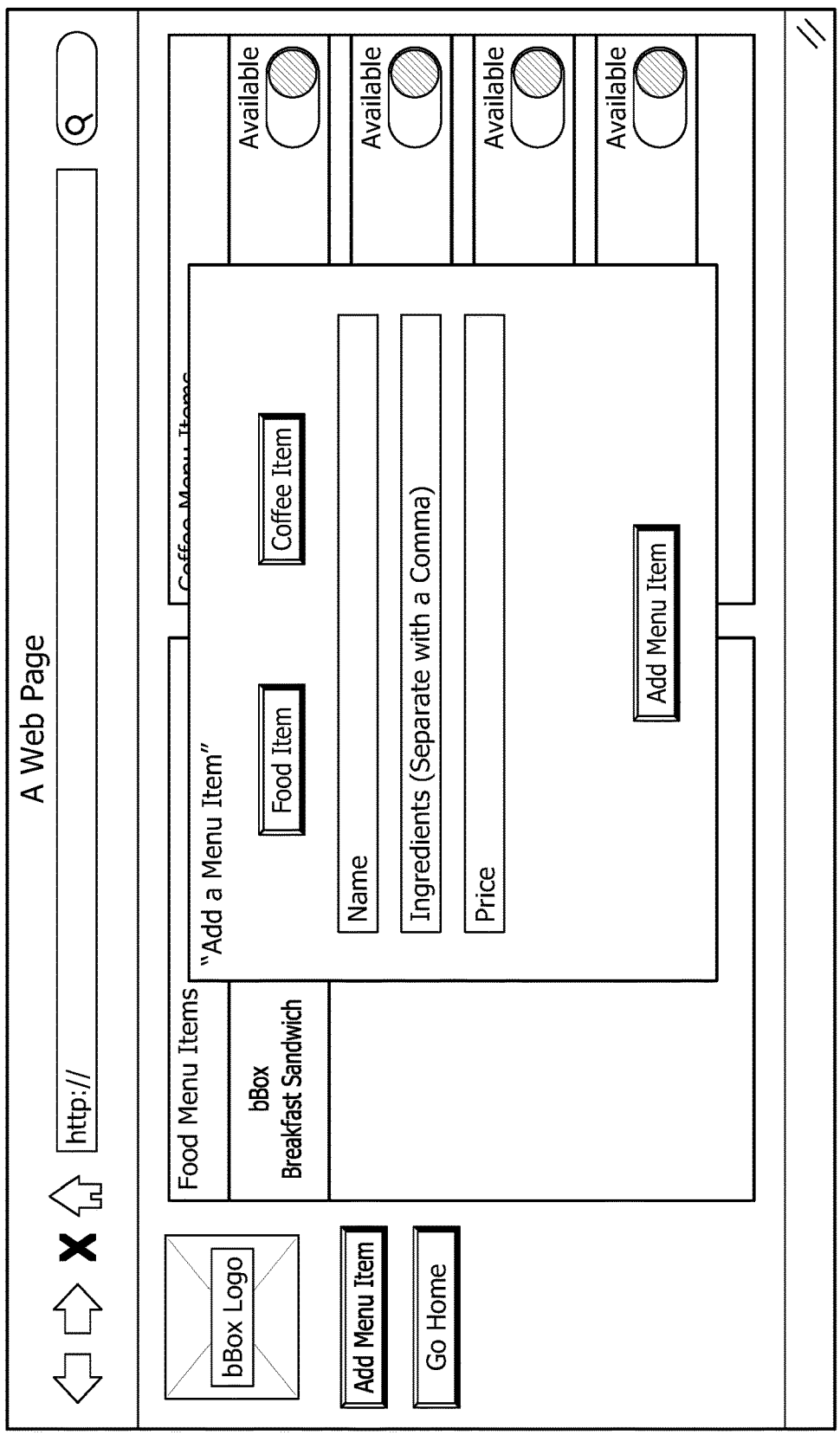
FIG. 15 shows one embodiment of the information that can be input when adding, revising or deleting a menu offering at a specific retail location for the system.
Figure 19:
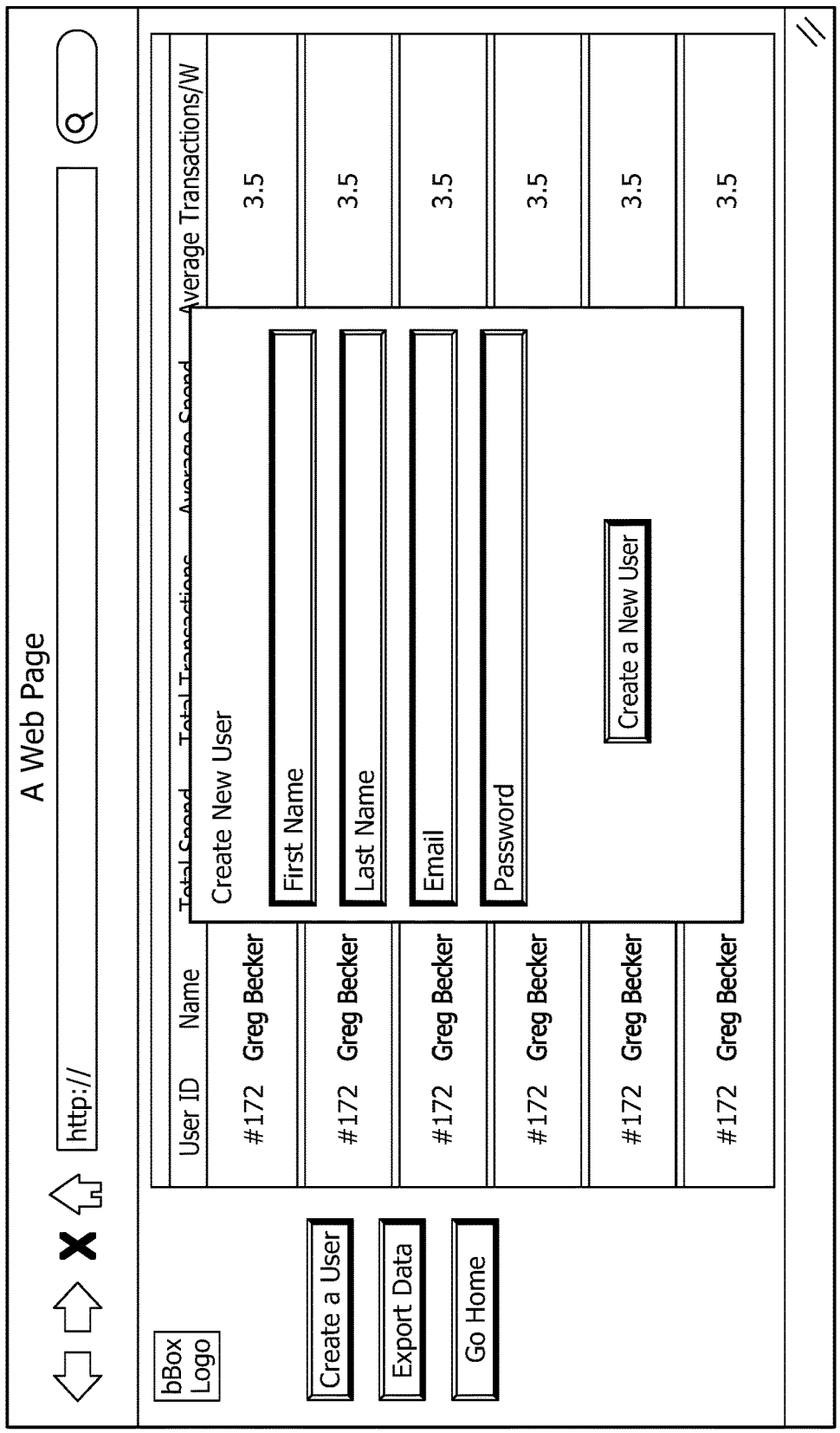
FIG. 19 shows one embodiment of an operator's option to add, revise or delete a user.

The subject matter of this invention is now described with reference to FIG. 3 which depicts the submission, preparation, assembly and delivery of a food order. The Example is provided for the purpose of illustration only, and the subject matter is not limited to the Example, but rather encompasses all variations which are evident as a result of the teaching provided herein. The example can be implemented with regard to a QSR or other retail establishment, such as a casual dining restaurant, and includes a general-purpose computing device, real time positioning system, an internet access point, a wireless access point, a portable personal device, and a food and/or beverage product. The general-purpose computing device can be a portable personal device such as a mobile phone, smart phone or tablet. The internet access point can be a wireless access point.

Account Login

The individual begins by visiting a website or loading a computer application, 305. A server determines if this is the first visit by the general-purpose computing device, 307. If the server determines this is a subsequent visit by the general-purpose computing device, prior general information (e.g., name, contact information, payment method, etc.) is loaded, 308. If this is the first visit by the general-purpose computing device the user may proceed with the order.

Location Determined

After the individual logs into an account or proceeds with the order submission, the individual's location is determined, 309. With regard to the individual's location, it can be updated as the individual moves. The individual's location may be updated at set time intervals or updated in real time.

Display Retail Locations

Once the individual's location is established, retail locations meeting the customer's preferences are identified 311. Information related to the identified locations 313 and menus 315 are displayed. More than one retail locations may be displayed at a time. In addition, the individual and/or system may prioritize or preselect specific retail locations for display. Multiple retail locations may be displayed on a map and the individual may select which retail location's menu they want to preview. Conversely, retail location may be displayed one at a time.

Categories other than proximity may be set by the individual and/or system to narrow the list of potential retail locations. For example, the individual may wish to purchase a bacon egg and cheese breakfast sandwich. A retail location serving breakfast burritos may be closer in proximity to the individual; however, because the individual was specific about the category of food desired, the closest retail location with a bacon egg and cheese breakfast sandwich on the menu will be displayed.

Retail Location Selected

Once the individual selects a retail location, the individual is prompted to submit an order from the displayed retail location 316. If the individual declines to submit an order from the displayed retail location, the individual is prompted to select a substitute retail location 311 or the next closest retail location can be automatically selected 313 and its corresponding menu 315 can be displayed. The following query repeats until the individual selects a new retail location.

As part of the retail location selection process, the individual can reserve a table. If the individual submits an order, the individual will be able to: (1) arrive at the restaurant; (2) be seated and (3) have their order brought to them within a short time. The advantage of such an added component are faster table turns, reduced food waste, improved food purchasing power, improved customer experience, improved restaurant efficiency, and reduced labor requirements.

Order Submitted

Once an individual selects a retail location to order from they can create their order, 316. For example, an individual can elect to add coffee, a sandwich, an espresso or any combination thereof to their order. The individual can further customize their order. For example, the individual may wish to have cream but no sugar in their coffee and their breakfast sandwich made with egg whites only.

The individual's past orders may also be stored. The individuals most recent order will be deemed to be their usual order unless the individual otherwise designates a different order. The individual can designate their usual selection within the past stored orders. That way, an individual who always wishes to order a bacon, egg and cheese sandwich with a coffee containing two creams and one sugar can simply order "The Usual" with one (1) click. Thus streamlining the ordering process.

When the individual is finished selecting/customizing their order, they will be prompted to confirm their order 317. If the server determines this is an initial visit by the general-purpose computing device, general information (e.g., name, contact information, payment method, etc.) is requested 318. Upon confirming their order, the individual will proceed to checkout where they will be prompted to submit a payment method, 319, submit additional information and/or complete their user profile. The order will then be transmitted to the server which will subsequently transmit the order to the retail location and/or stored it for later recall.

Customer Notification

The customer will have the option of setting an alarm to provide certain reminders 325. For example, a customer may wish to place an order for lunch at 8:00 am with the intention of going to lunch at 12:00 pm. In such a situation, the customer may elect to submit the order at 8:00 am and set a reminder to leave for lunch at 11:45 am. Then at 11:45 am the customer would receive a notification on their general-purpose computing device reminding them of their desire to leave for lunch at 12:00 pm 326.

Determination of Individual ETA

The system first determines the distance between the individual and the retail location from the Real-Time Positioning Device, 324. Using information from the Real-Time Positioning Device, the system determines how fast the individual is approaching the retail location, 324. From these two pieces of information, the system determines the individual's estimated time of arrival at the retail location. Additional information, such as traffic conditions described below, can be incorporated into the ETA calculation. In some embodiments of the invention the estimated time of arrival 324 is updated at a set interval. The set interval can be continuous and result in real time updates to the individual's ETA, 327.

Prioritization of Preparation, Assembly and Packaging of a Food Order

To coordinate the JIT delivery of the food and/or beverage product to the individual, the system also determines the time it will take to prepare, assemble and package the order, 322. Orders are typically submitted as combinations of food and/or beverage products, each requiring a different time frame to prepare, assemble and package the food and/or beverage product. As a result, the time to prepare, assemble and package the food order is variable and can be prioritized For example, a cup of coffee may take one (1) minute to prepare, assemble and package whereas a bacon egg and cheese sandwich may take two (2) minutes to prepare, assemble and package. The time it will take to prepare, assemble and package the entire order will therefore be between two (2) minutes if the coffee and sandwich are prepared in parallel (i.e., at the same time) and three (3) minutes if they are prepared in series (i.e., one after the other).

In some embodiments of the invention, due to prioritization of multiple orders, the preparation, assembly and packaging of the food and/or beverage product may utilize a hybrid parallel/series approach. For example, the preparation, assembly and packaging of the bacon egg and cheese sandwich may commence thirty seconds after the preparation of the coffee commences. Such a hybrid approach would result in the order taking two minutes and thirty seconds to prepare, assemble and package.

In some embodiments of the invention, multiple food orders will be submitted at or around the same time. Such a situation can necessitate orders being prioritized based on what individuals ordered and which individual is predicted to arrive first based on their calculated ETA. In some embodiments of the invention, prioritization is updated at a set interval. The set interval can be continuous and result in real time updates to the prioritization.

Due to prioritization of multiple orders, in some embodiments of this invention the preparation, assembly and packaging of the food and/or beverage product may not be dedicated solely to one individual. For example, if two individuals both order a bacon egg and cheese sandwich and the retail location begins making one sandwich for the first individual but through continuous updating of their ETAs it is determined that the second individual will actually arrive at the retail location before the first individual the sandwich being prepared can be reassigned to the second individual's order and a new sandwich can be prepared to more closely align with the first individual's ETA.

Proximity Threshold Determination

To assist in the prioritization of orders a dynamic proximity threshold is disclosed. The proximity threshold establishes an event horizon in space and/or time that once crossed triggers the preparation, assembly and packaging of the food order.

For example, if an individual is traveling towards the retail location at sixty (60) miles per hour and the food order takes one (1) minute to prepare and assemble, the proximity threshold will be set at one (1) mile from the retail location. Once the individual crosses the designated threshold 328, the preparation, assembly and packaging of the order will commence and the individual may be charged for the order. In some embodiments of the invention, the proximity threshold is updated at a set interval, 327. The set interval, 327, can be continuous and result in real time updates to the proximity threshold.

In some embodiments of the invention, multiple proximity thresholds may be set. For example, a proximity threshold may be set to trigger the preparation of the order, another proximity threshold may be set to trigger the assembly of the order and a third may be set to trigger acceptance of payment.

In some embodiments of the invention, the individual will be notified of the progress of the preparation, assembly and packaging of the food and/or beverage product, 329.

Notification of Arrival of Individual

When the individual arrives at the retail location, the retail location will be notified. The individual can proceed to the counter or the reserved table where the retail location can confirm the customer's identity. Examples of the identity confirmation process are an assigned bar code displayed on the customer's mobile device that can be scanned by an agent or employee of the retail location or a mobile device or wearable component that uses low energy Bluetooth and/or Near Field Communication proximity sensing to transmit a universally unique identifier picked up by a compatible app or operating system in the retail location and the real time positioning system which confirms the individual has entered the retail location. Other identification technologies, such as biometric authentication, can also be used.

The retail location may also display a Quick Response (QR) code. An individual arriving at the retail location will have the option of scanning the QR code displayed at the retail location. The individual's mobile device will then transmit a notice of arrival to the retail location.

In either example, upon notification, the food order will be delivered to the individual, 330. In some embodiments of the invention, the individual will also be requested to provide feedback and/or data with regard to their experience, 332.

COLLECTION OF DATA

In some configurations, during the creation of orders described above, a storage device or resource can be used to store relevant data. Examples of the data contemplated for storage are user personal data, traffic data and weather data. The data stored can be incorporated into the disclosed system and methods to refine the proximity threshold determination to permit just-in-time order, assembly and delivery of food and/or beverage products. In addition, collected data may be used for single command ordering, micro-targeting advertisements or other value added parameters described below.

User Personal Data

The invention contemplates that, in some instances, this gathered data might include user personal and/or sensitive data. The invention further contemplates that the entities responsible for the collection, analysis, disclosure, transfer, storage, or other use of such data should implement and consistently use privacy policies and practices that are generally recognized as meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

User Opt-Out

Despite the foregoing, the invention also contemplates embodiments in which users selectively block the use of, or access to, personal data. That is, the invention contemplates that hardware and/or software elements can be provided to prevent or block access to such personal data. For example, the present technology can be configured to allow users to select the data that is stored in cloud storage. In another example, the present technology can also be configured to allow a user to specify the data stored in cloud storage that can be shared with other users.

Therefore, although the invention broadly covers use of personal data to implement one or more various disclosed embodiments, the invention also contemplates that the various embodiments can also be implemented without the need for accessing such personal data. That is, the various embodiments of the present technology are not rendered inoperable due to the lack of all or a portion of such personal data.

Traffic Data

Traffic can impact the speed at which an individual approaches a retail location thereby requiring the proximity threshold be updated in real time to account for traffic delays, if any. Using the data from the real time positioning component the system can determine the most likely route to the retail location and if the individual will be subject to any traffic delays. The traffic data stored can be public or private data for public transportation (e.g., buses, trolleys subway or rail) or private transportation (e.g., car, bike, motorcycle).

Examples of sources of traffic data are the New York Metropolitan Transit Authority (NYMTA), which has been providing traffic data on subway arrival and departure for a few years now via the mobile application, NYC Subway Times, and the New York City Department of Transportation's (NYCDOT) Traffic Management Center (TMC), which maintains a map of traffic speed detectors throughout the City for vehicles. The NYCDOT TMC's speed detector themselves belong to various city and state agencies; however, the speed data is available free of charge. The Traffic Speeds Map is available on the NYCDOT's website (http://nyctmc.org/). This data feed contains real-time traffic information from locations where NYCDOT picks up sensor feeds within the five boroughs, mostly on major arterials and highways.

The storage and incorporation of traffic data will permit the system to be forward looking in its calculation of the proximity threshold to permit just-in-time preparation, assembly and delivery of the food and/or beverage product order.

For example, an individual may be traveling towards the retail location at sixty (60) miles per hour (mph) and the food order may take one (1) minute to prepare, thereby suggesting a proximity threshold of one (1) mile. However, traffic data may indicate that a half-mile before the retail location traffic slows to twelve (12) mph. The incorporation of such traffic data indicates that it will take the individual three (3) minutes to traverse the last mile to the retail location. As a result, to assure just-in-time delivery of the food order, incorporating the traffic data, the proximity threshold should be set to one fifth (⅕) of a mile instead of one mile.

Although the invention broadly covers use of traffic data to implement one or more various disclosed embodiments, the invention also contemplates that the various embodiments can also be implemented without the need for accessing such traffic data. That is, the various embodiments of the present technology are not rendered inoperable due to the lack of all or a portion of such traffic data.

Weather Data

Weather can impact the speed and route at which an individual approaches a retail location thereby requiring the proximity threshold be updated in real time to account for weather delays, if any. Using the data from the real time positioning component the system can determine the most likely route to the retail location and if the individual will be subject to any weather delays. The weather data stored can be public or private data. Using the data the system can be forward looking in determining if an individual will encounter weather related delays (e.g., a thunderstorm is approaching the individual and will require that they reduce their speed)

For example, an individual may be walking towards the retail location at six (6) miles per hour (mph) and the food order may take ten (10) minutes to prepare, thereby suggesting a proximity threshold of one (1) mile. However, weather data may indicate that a half-mile before the retail location the individual will encounter a thunderstorm a half mile in diameter travelling thirty (30) mph in the opposite direction, which will cause the individual to seek shelter. The system can incorporate this forward looking project to determine the individual will not move for the one minute the storm is above and then resume approaching the retail location at 6 mph. As a result, to assure just-in-time delivery of the food order, incorporating the weather related delay, the proximity threshold should be set to nine tenths (⁹⁄₁₀) of a mile instead of one mile.

Weather data can also be helpful in projecting what food and/or beverage products should be offered and/or advertised by a retail location. Typically, hot beverages do not sell as well during a heat wave and individuals do not purchase as much ice cream when it is cold out. As a result, a menu and advertisements can be tailored in real time to take advantage of the weather data.

INCORPORATION OF ADDITIONAL PARAMETERS

Micro-Targeting Advertisements

As described above, in some configurations, the data contemplated for storage are user personal data for micro-targeting advertisement purposes. The system will use the collected personal data outlined above to identify the interests of specific individuals with the goal being to delivery messages to the individual through the individual's preferred communication channel. For example, the personal data that is collected may suggest that an individual supports a certain sports team. The system may notify the individual of upcoming matches for that specific team as part of the general notifications, 222.

Scheduled Order Trigger Times

As described above, in some configurations, the customer may wish to submit an order at one time but wait to pick up the order until a later time. For example, the customer may wish to place an order for a pizza at 2:00 pm but not wish to pick it up until 6:00 pm. If the customer will not be close to the retail location, the customer will not cross the proximity threshold thereby triggering the food preparation. However, if the customer will be in close proximity to the retail location prior to their preferred pick up time, the system can provide an option to restrict transmitting the order to the retail location to a certain time window. Using the pizza example above, the customer can elect to place the order at 2:00 pm but restrict the transmittal of the order to the retail location until after 5:30 pm. That way the customer will not inadvertently trigger the order preparation before the customer wishes to pick up the order.

The customer may also wish to schedule automatic orders. For example the customer may wish to order a breakfast sandwich and coffee every Monday through Friday morning from a specific retail location. The food product order file can store this automatic order and transmit it to the retail location every morning. In certain embodiments, the system may provide for a one click confirmation of the automatic order which at a certain distance from the retail location will prompt the customer to confirm the order.

Integration of Multiple QSR/Restaurant Chains

The system disclosed is not limited to a single QSR/Restaurant chain. It is intended to provide the customer with a panoply of options. A customer may initially narrow the options they wish to view, however, the system can recommend alternatives based on personal data such as prior order history, geographic location of the customer, third party reviews of the relevant retail locations, or advertising services purchased by the retail locations.

For example, a customer from Chicago, who is travelling in Philadelphia, may initially request options to order from Steak n' Shake® which is a registered trademark of Steak 'n Shake Enterprises, Inc. However, if Steak n' Shake does not have a location in Philadelphia the system may display Shake Shack's® menu, which is a registered trademark of Shake Shack Enterprises, Inc. and has similar menu options. In addition, if the customer narrows the request to only breakfast sandwiches, the customer can be provided with the option to purchase a sandwich from any number of QSR/Restaurant chains that have breakfast sandwiches on their menus. The customer can then decide which QSR/Restaurant to order from.

Location Maps

The retail location or a third party may also transmit directions to the retail location to the customer. These directions may be in audio or visual form. For example, an individuals from Chicago traveling in Philadelphia may purchase a cheesesteak from a retail location but be unsure of the preferred route to the retail location. In this situation, using the customer location data obtained from the real time positioning system the server may determine and transmit a map of the preferred route to the retail location to the customer's mobile device. Then by continuously monitoring the customer's location, the system can provide turn by turn directions to the customer until the customer arrives at the retail location.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A system for ordering food comprising:
   a software application operating on a mobile computer device or on a computer device that is synced with the mobile computer device having a real-time positioning system component, the software application configured to receive a customer order and a payment method and to communicate the customer order through a wired and/or wireless communication network to a retail server located at a retail location or a remote server in communication with the retail server through the wired and/or wireless communication network; and
   a processor that is in communication through the wired and/or wireless communication network with the software application, as well as the retail server and/or remote server, the processor is configured to call up from a database of the system upon communication of the customer order to the retail server: (1) a predetermined preparation time for a customer order, which has been previously uploaded by an owner, employee or agent of the retail location, (2) a first proximity threshold, which has been previously designated by the owner, employee or agent of the retail location, and (3) a predetermined time to assemble the customer order, which has been previously uploaded by an owner, employee or agent of the retail location;
   whereby the processor is configured to actively monitor a real-time location of the mobile computer device from time of order through to arrival of the mobile computer device at the retail location using the real-time positioning system component;
   whereby the processor is configured to determine a second proximity threshold by comparing the predetermined preparation time for the customer order against an estimated travel time of the mobile computer device relative to the retail location based on real-time positional data related to movement of the mobile computer device;
   whereby the processor is configured to determine a third proximity threshold by comparing the predetermined assembly time for the customer order against an estimated travel time of the mobile computer device relative to the retail location based on real-time positional data related to movement of the mobile computer device;
   whereby when the processor determines that the mobile computer device has traversed or is within the area of the first proximity threshold, within a range of tolerance, the processor is configured to submit the payment method for settlement;
   whereby when the processor determines that the mobile computer device has traversed or is within the area of the second proximity threshold, within a range of tolerance, the processor is configured to notify the retail server that preparation of the customer order should begin so that the completion of the customer order is coordinated with the arrival of the mobile computer device at the retail location; and
   whereby when the processor determines that the mobile computer device has traversed or is within the area of the third proximity threshold, within a range of tolerance, the processor is configured to notify the retail server that assembly of the customer order should begin so that the completion of the customer order is coordinated with the arrival of the mobile computer device at the retail location.

2. The system of claim 1 wherein, based on active monitoring of the real-time location of the mobile computer device using the real-time positioning system component, the system is configured to notify the retail server when the mobile computer device arrives at the retail location.

3. The system of claim 1 wherein the first proximity threshold is the exterior of the retail location.

4. The system of claim 1 wherein the system is configured to store a prior order.

5. The system of claim 1 wherein the system is configured to accept and prioritize two or more customer orders based on the active monitoring of the real time location of mobile computer devices related to each customer order.

6. The system of claim 1 wherein the comparison of the predetermined preparation time to the location of the mobile computer device is delayed to a later time.

7. The system of claim 1 wherein the mobile computer device is a wearable device.

8. A system for ordering food comprising:
a website accessible through a wired or wireless communications network by a unique mobile computer device having a real-time positioning system component or by a computer device that is synced to a software application operating on the unique mobile computer device, whereby the unique mobile computer device is assigned a unique registered customer credential;
a processor that is in communication through the wired and/or wireless communication network with the unique mobile computer device and/or computer device, as well as a retail computer device, the processor is configured to call up from a database when a customer order is placed through the website: (1) a payment method which has been previously uploaded by a customer, (2) a predetermined preparation time for the customer order, which has been previously uploaded by the owners, employees or agents of the retail location, (3) a first proximity threshold, which has been previously designated by the owners, employees or agents of the retail location; (4) a predetermined time to assemble the customer order, which has been previously uploaded by an owner, employee or agent of the retail location;
wherein the processor is configured to actively monitor a real-time location of the unique mobile computer device from a time the customer order is placed on the website through to arrival of the unique mobile computer device at a retail location using the real-time positioning system component;
wherein the processor is configured to determine a second proximity threshold by comparing the predetermined preparation time for the customer order against an estimated travel time of the unique mobile computer device relative to the retail location based on real-time positional data related to movement of the unique mobile computer device;
wherein the processor is configured to determine a third proximity threshold by comparing the predetermined assembly time for the customer order against an estimated travel time of the unique mobile computer device relative to the retail location based on real-time positional data related to movement of the unique mobile computer device;
wherein when the processor determines that the mobile computer device has traversed or is within the area of the first proximity threshold, within a range of tolerance, the processor is configured to submit the payment method for settlement;
wherein when the processor determines that the unique mobile computer device has traversed or is within the area of the second proximity threshold, within a range of tolerance, the processor is configured to notify the retail server that preparation of the customer order should begin in order to coordinate completion of the customer order with the arrival of the unique mobile computer device at the retail location; and
wherein when the processor determines that the unique mobile computer device has traversed or is within the area of the third proximity threshold, within a range of tolerance, the processor is configured to notify the retail server that assembly of the customer order should begin in order to coordinate completion of the customer order with the arrival of the unique mobile computer device at the retail location.

9. The system of claim 8 wherein based on active monitoring of the real time location of the unique mobile computer device using the real-time positioning system component, the system is configured to notify the retail computer device when the unique mobile computer device arrives at the retail location.

10. The system of claim 8 wherein the first proximity threshold is the exterior of the retail location.

11. The system of claim 8 wherein the system is configured to store a prior customer order.

12. The system of claim 8 wherein the system is configured to accept and prioritize two or more customer orders based on monitoring the real time location of multiple unique mobile computer devices.

13. The system of claim 8 wherein the comparison of the predetermined preparation time to the location of the unique mobile computer device is delayed to a later time.

14. The system of claim 8 wherein the unique mobile computer device is a wearable device.

* * * * *